US008046687B2

(12) United States Patent
Balassanian

(10) Patent No.: US 8,046,687 B2
(45) Date of Patent: *Oct. 25, 2011

(54) DIRECT MANIPULATION OF DISPLAYED CONTENT

(76) Inventor: Edward Balassanian, Seattle, WA (US)

(*) Notice: Subject to any disclaimer, the term of this patent is extended or adjusted under 35 U.S.C. 154(b) by 1021 days.

This patent is subject to a terminal disclaimer.

(21) Appl. No.: 11/933,196

(22) Filed: Oct. 31, 2007

(65) Prior Publication Data

US 2008/0141154 A1   Jun. 12, 2008

Related U.S. Application Data

(63) Continuation of application No. 10/536,108, filed on Jul. 13, 2006, and a continuation of application No. 10/300,244, filed on Nov. 19, 2002, now abandoned, which is a continuation of application No. 09/478,920, filed on Jan. 6, 2000, now Pat. No. 6,507,349.

(51) Int. Cl.
*G06F 3/00* (2006.01)

(52) U.S. Cl. ............... 715/720; 715/769; 715/863

(58) Field of Classification Search ............ 715/720, 715/769, 863

See application file for complete search history.

(56) References Cited

U.S. PATENT DOCUMENTS

| | | | |
|---|---|---|---|
| 5,081,592 A | 1/1992 | Jenq | |
| 5,196,838 A | 3/1993 | Meier et al. | |
| 5,202,961 A | 4/1993 | Mills et al. | |
| 5,381,158 A | 1/1995 | Takahara et al. | |
| 5,388,197 A | 2/1995 | Rayner | |
| 5,461,711 A | 10/1995 | Wang et al. | |
| 5,546,528 A | 8/1996 | Johnson | |
| 5,568,603 A * | 10/1996 | Chen et al. | 715/784 |
| 5,600,777 A | 2/1997 | Wang et al. | |
| 5,634,064 A | 5/1997 | Warnock et al. | |
| 5,694,561 A | 12/1997 | Malamud et al. | |
| 5,760,771 A | 6/1998 | Blonder et al. | |
| 5,835,156 A | 11/1998 | Blonstein et al. | |
| 5,872,566 A | 2/1999 | Bates et al. | |
| 5,914,714 A | 6/1999 | Brown | |

(Continued)

FOREIGN PATENT DOCUMENTS

EP   0528597 A2   2/1993

(Continued)

OTHER PUBLICATIONS

Adobe Systems Incorporated, "Adobe Acrobate Reader 4.0 Guide", Feb. 1999, pp. 1-54.

(Continued)

*Primary Examiner* — Ashraf Zahr

(57) ABSTRACT

A method, system, and computer-readable medium for performing direct manipulation of displayed content (e.g., dragging the displayed content or a portion thereof in a particular direction). A user may perform a variety of direct manipulations of displayed content to modify the display without separate content manipulation controls. Such direct manipulations modify the display by altering the value of content properties affecting the display. Properties can include an amplitude affecting the size or level with which information is presented (e.g., volume of audio, size of visual information), an information history that refers to a series of distinct groups of information that are related over time, and a channel that specifies which of multiple groups of information is displayed. The value of a property is modified according to the manipulations, and the display updated to reflect the new value of the property. The user can map which manipulations correspond to which properties.

17 Claims, 18 Drawing Sheets

U.S. PATENT DOCUMENTS

| | | | |
|---|---|---|---|
| 5,999,173 A | 12/1999 | Ubillos | |
| 6,061,062 A | 5/2000 | Venolia | |
| 6,122,558 A | 9/2000 | Barnes | |
| 6,154,194 A * | 11/2000 | Singh | 345/661 |
| 6,204,840 B1 * | 3/2001 | Petelycky et al. | 715/202 |
| 6,237,010 B1 | 5/2001 | Hui et al. | |
| 6,320,577 B1 | 11/2001 | Alexander | |
| 6,335,730 B1 | 1/2002 | Gould | |
| 6,441,837 B1 | 8/2002 | Harding et al. | |
| 6,522,342 B1 * | 2/2003 | Gagnon et al. | 715/716 |
| 6,538,665 B2 | 3/2003 | Crow | |
| 6,639,584 B1 | 10/2003 | Li | |

FOREIGN PATENT DOCUMENTS

EP      0913807 A2      5/1999

OTHER PUBLICATIONS

IBM Technical Disclosure Bulletin, "Direct Manipulation Control for Container Objects", vol. 37, No. 7, New York, Jul. 1994, p. 335.
Unknown, 10 Minute Guide to Microsoft Outlook 98, Mar. 23, 1998, Que.

* cited by examiner

DIRECT MANIPULATION OF DISPLAYED CONTENT

CROSS REFERENCE TO RELATED APPLICATION

PRIORITY CLAIM

This application is a continuation of U.S application Ser. No. 10/536,108 filed Jul. 13, 2006, is a continuation of U.S. patent application Ser. No. 10/300,244, filed Nov.19, 2002 now abandoned which is a continuation of U.S. patent application Ser. No. 09/478,920, filed Jan. 6, 2000 now U.S. Pat. No. 6,507,349.

TECHNICAL FIELD

The following disclosure relates generally to user interfaces, and more particularly to manipulating various types of displayed multimedia content without using separate content manipulation controls.

BACKGROUND

The following application is incorporated by reference as if fully set forth herein: U.S. application Ser. No. 10/536,108 filed Jul. 13, 2006.

As computers become increasingly pervasive, the need increases for simple and effective ways to display and manipulate information. This need is exacerbated by the ever-increasing variety of types of information that are presented via computer. Such information types include still images, video information consisting of a series of frames of still images (e.g., a stored video clip, or each channel of a cable television stream of multiple channels), audio information consisting of a series of one or more distinct sounds (e.g., a song or a telephone conversation), textual information (e.g., text documents, World Wide Web pages, and email), and mixed-media information types (e.g., movies with both video and audio information).

Information is generally presented to a user as one or more groups of logically distinct related information, such as a still image, a frame of video information, a single sound or note of audio information, or a single multi-page text document. While logically distinct, such groups of related information may or may not be stored separately from other related groups of the information (e.g., a series of multiple frames of video information or of multiple sounds may be stored together).

Examples of various information types are shown in FIGS. 1A-1F. In particular, FIG. 1A is an example of a still image with content 110 displayed in window 100 (e.g., one of multiple windows in a graphical user interface (GUI) environment, or a single window covering the entire available display area). In addition, the content 110 displayed in FIG. 1A can be the first of three frames of an example animated video clip, shown in FIGS. 1A-1C with displayed content 110, 120, and 130 respectively. Visual representations of two distinct parts of an example stored audio clip are shown in FIGS. 1D and 1E, with the visual representations having displayed content 140 and 150 respectively that each correspond to a different set of groups of audio information. When the audio information is presented audibly via speakers of a computer, the visual representation may be displayed simultaneously, or the visual representation may instead be used in other situations such as when editing the audio information. The displayed content of the window in FIGS. 1D and 1E also includes a timeline 145 that has been dynamically added to the stored audio information. FIG. 1F is an example of textual information with displayed content 160 shown in window 100.

When information is displayed on a computer, one or more of a variety of types of displayed content manipulation controls are typically used to control what content is to be displayed and how that content is shown. FIGS. 2A-2C illustrate examples of various common content manipulation controls. In FIG. 2A, content group 110 is shown in window 100, along with various displayed content manipulation controls 205-245. Additional displayed content manipulation controls 250 are also shown in a separate window. Common content manipulation controls that can be used to affect the display of content group 110 include pull-down menus 210 (with various possible manipulation options), a pop-up menu 215 (with various possible manipulation options), and a text input-based zoom control 220.

In some situations, all of the content group is displayed at the same time. However, when only a portion of the currently displayed content group 110 is visible (e.g., a single page of a multi-page document), some environments provide controls to allow the user to select non-displayed portions of the content group for display. Such controls include slider control scroll bars 205 and page up and down buttons 207. Other environments may allow a user to anchor a displayed cursor 252 to the displayed content at a selected point, and to then drag the content group around the window so as to display non-visible portions of the current content group.

Drag control 225 and button control 230 can be used to manipulate the size of window 100. For example, selection of button control 230 may cause window 100 to be expanded to fill the entire visible area. In some situations, changing the size of the window may alter the portion of the content group 110 that is displayed (e.g., when shrinking the window, only part of the previously-visible content may remain visible), or may alter how the same portion of the content group is displayed (e.g., when shrinking the window, all of the previously visible content may be displayed at a reduced zoom level). In addition, some windows may include an additional button control (not shown) that, when selected, will close the window, while other windows may be closed in other ways such as selection of a menu option or toolbar button.

Content manipulation controls 235-250 may also be useful depending on the type of content displayed. For example, if content group 110 is multimedia information that includes accompanying audio information, button controls 235 can be used to control the volume at which the audio information is presented. For time-based information (e.g., video or audio information), button controls 240 can be used to control the particular portion of content to be displayed (e.g., a single video frame, or a collection of groups of audio information). Similarly, VCR-style button controls 250 may be used to control the particular portion of content displayed, as well as the rate at which time-based information is presented. Finally, if information content 110 is one of alternate groups of information available to be displayed (e.g., multiple channels of a cable television feed), controls 245 can be used to select a different group of content for display.

In FIG. 2B, textual information content 160 is shown in window 100 as part of a Web page document content group, along with various displayed content manipulation controls 255-275. In the illustrated embodiment, the Web page is part of a series of Web pages that have been previously viewed by the user, and button controls 255 can be used to move through this series of Web pages. Alternately, a button control such as 260 can be used to display a specific Web page, such as a user's Home page, while a text input control such as 265 allows the user to specify any particular Web page or other document for display. Button control 262 allows the user to specify a particular location in which to save a copy of the displayed page. Also available are four content-specific controls included with the content group. Controls 270 indicate two Web pages such that a user can choose one of the Web pages as a next document to display, while controls 275 allow a user to display previous or next portions of the current Web page document that are not currently displayed.

In FIG. 2C, textual information content 160 is shown in window 100 as part of an email message document content group, along with various displayed content manipulation controls 280-290. Email-specific portions of content are also displayed, including message header information 292 and included message information 294. The controls include button controls 280 to view related email documents, such as previous or next messages in a list of pending messages. Such a list can be organized in a variety of ways, such as by time received, by sender, or hierarchically as part of a message thread of related messages. Button controls 285 allow a user to create a new message that is part of the same message thread as the displayed message, while controls 290 modify how the email is stored by allowing the user to specify a new location in which the displayed message will be stored (e.g., a mail folder other than the Inbox) or to delete the message.

In addition to having a variety of displayed content manipulation controls, existing systems use a variety of techniques for selecting a content group that is to be displayed. FIGS. 3A and 3B illustrate examples of common techniques for selecting a content group. In FIG. 3A, a window 300 with two panes 302 and 304 is displayed (e.g., in response to selection of a displayed "Open" button or pull-down menu item (not shown) in window 100). Pane 302 contains a visual representation 310 of a hierarchical directory storage mechanism in which a variety of document content groups may be stored. When a visual representation of a particular storage location 315 (e.g., a directory or folder) is selected, visual representations 320 of the documents and of the collections of documents that are associated with storage location 315 are displayed. Selection of a particular document content group in pane 304, such as document CDE-B-Z 325, can allow that document to be displayed or otherwise manipulated. Similarly, a window 350 in FIG. 3B displays a visual representation 360 of a hierarchical organization of email message content groups. In particular, the messages are organized into threads of related messages. When a particular message 365 is selected, that message can be displayed or otherwise manipulated.

With the large variety of types of content manipulation controls available, and with many of them dependent on factors such as the type of content or the particular content being displayed, the use of such controls to display information can be difficult for a user to master. In particular, novice users may find such controls impossible to understand and use. Thus, a need exists for a simple and efficient user interface for displaying various information types and for manipulating such displayed information.

DETAILED DESCRIPTION

Figure 1A:
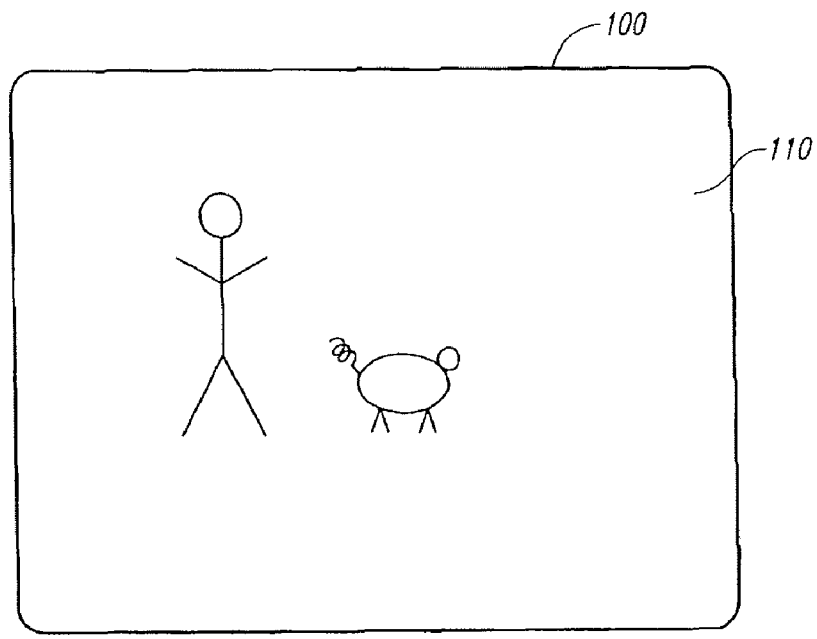
FIGS. 1A-1F illustrate examples of various information types.
Figure 1B:
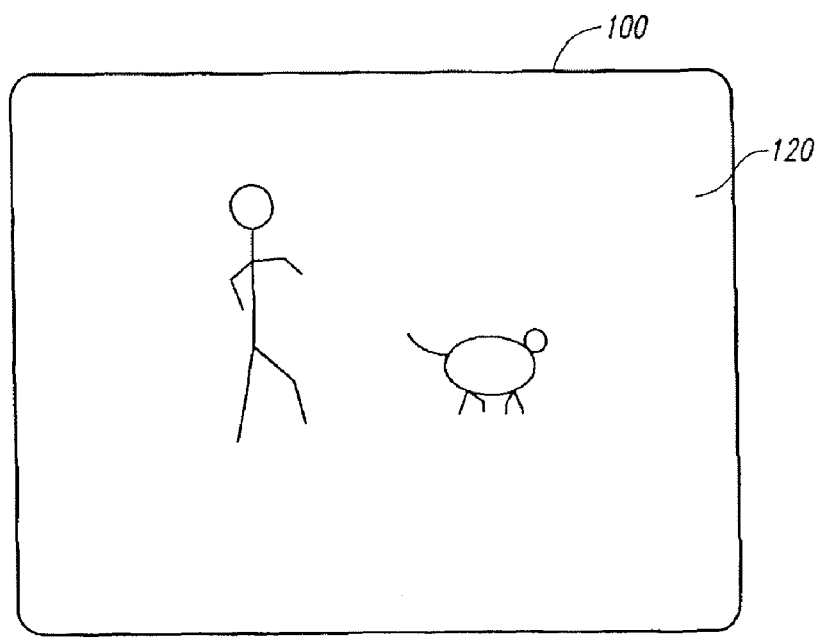
Figure 1C:
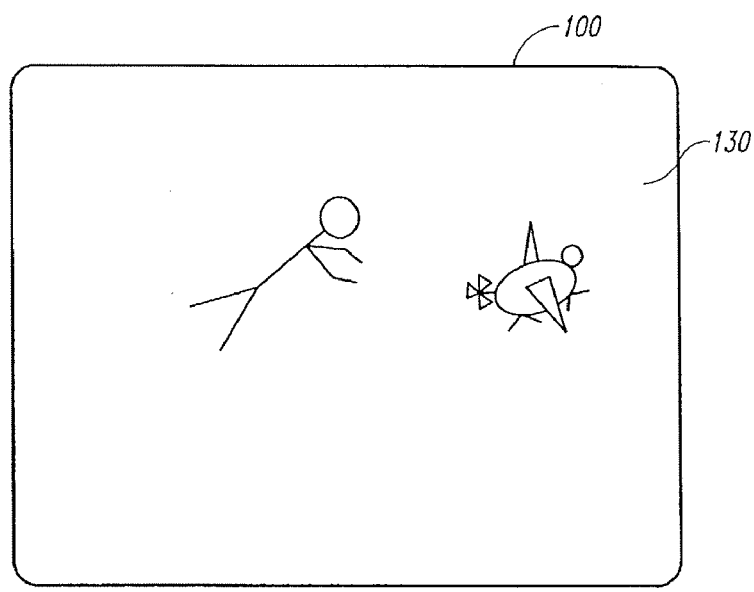
Figure 1D:
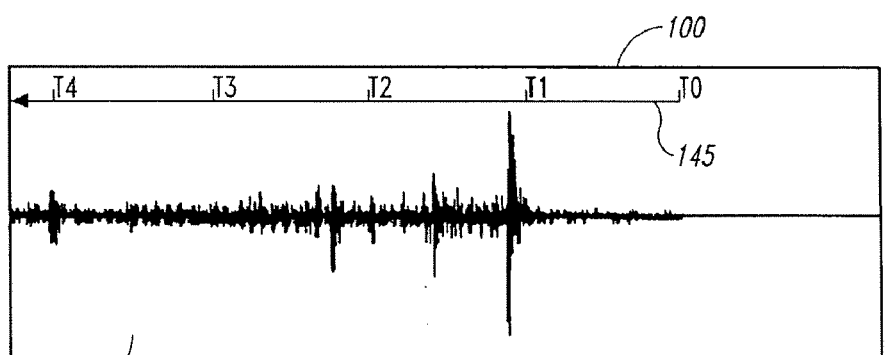
Figure 1E:
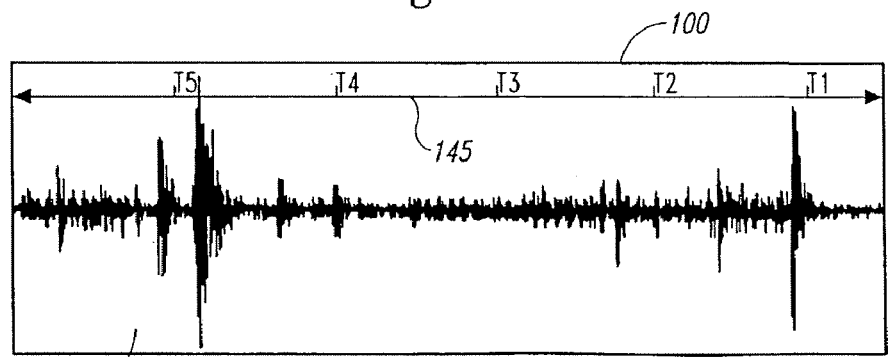
Figure 1F:
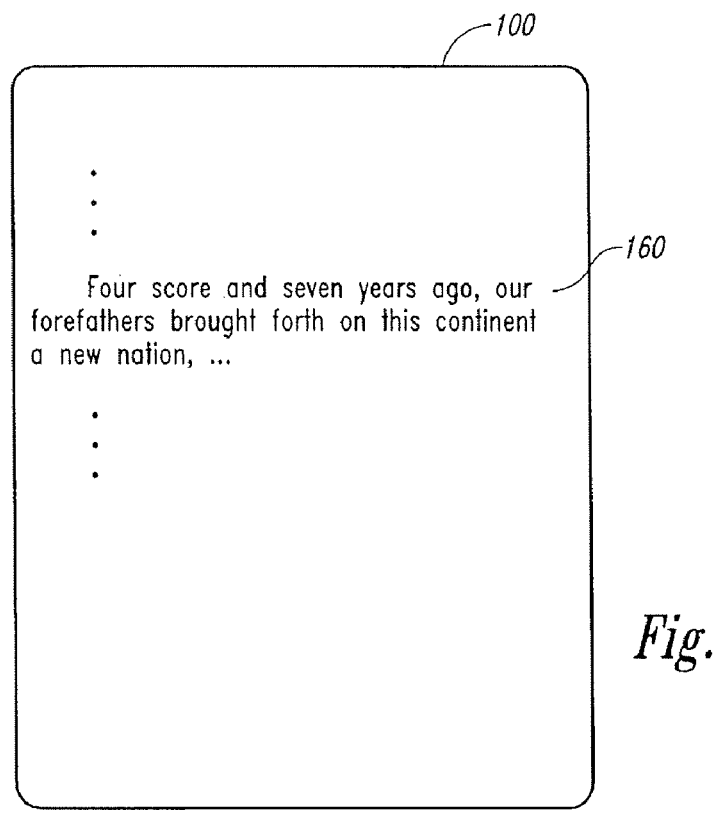
Figure 2A:
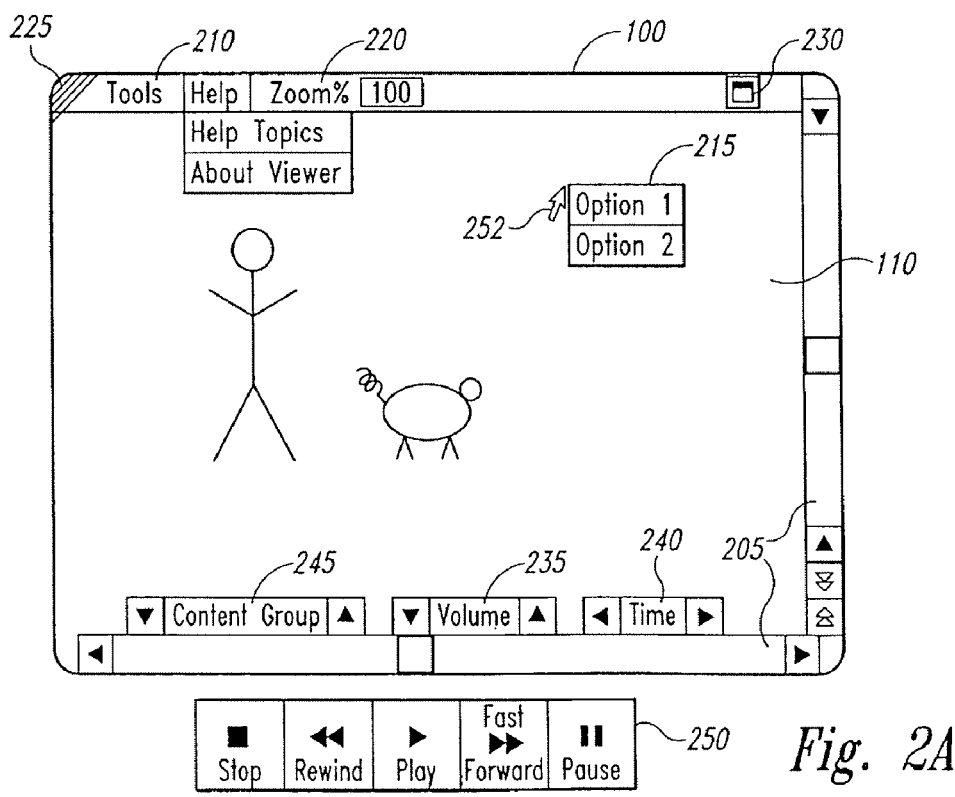
FIGS. 2A-2C illustrate examples of various common displayed content manipulation controls.
Figure 2B:
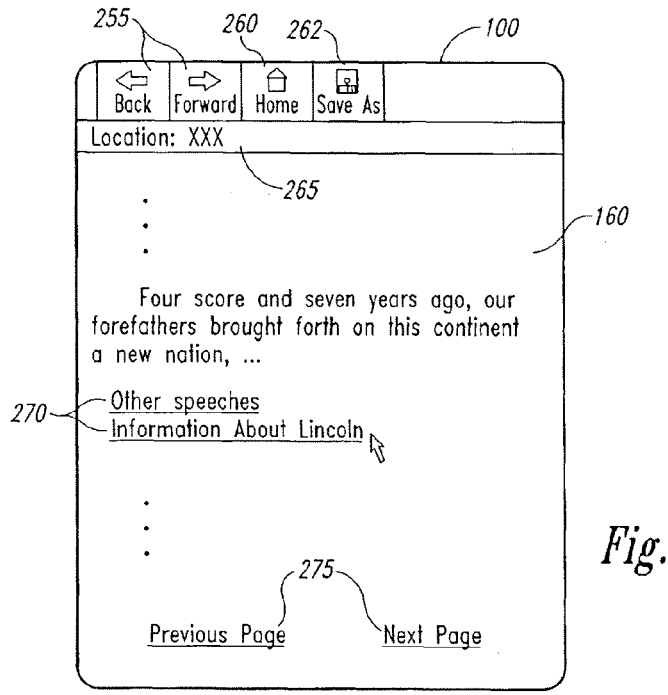
Figure 2C:
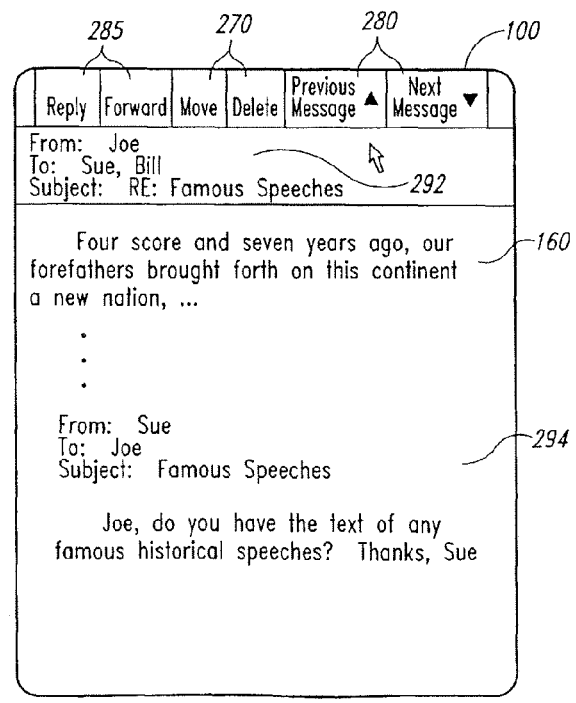
Figure 3A:
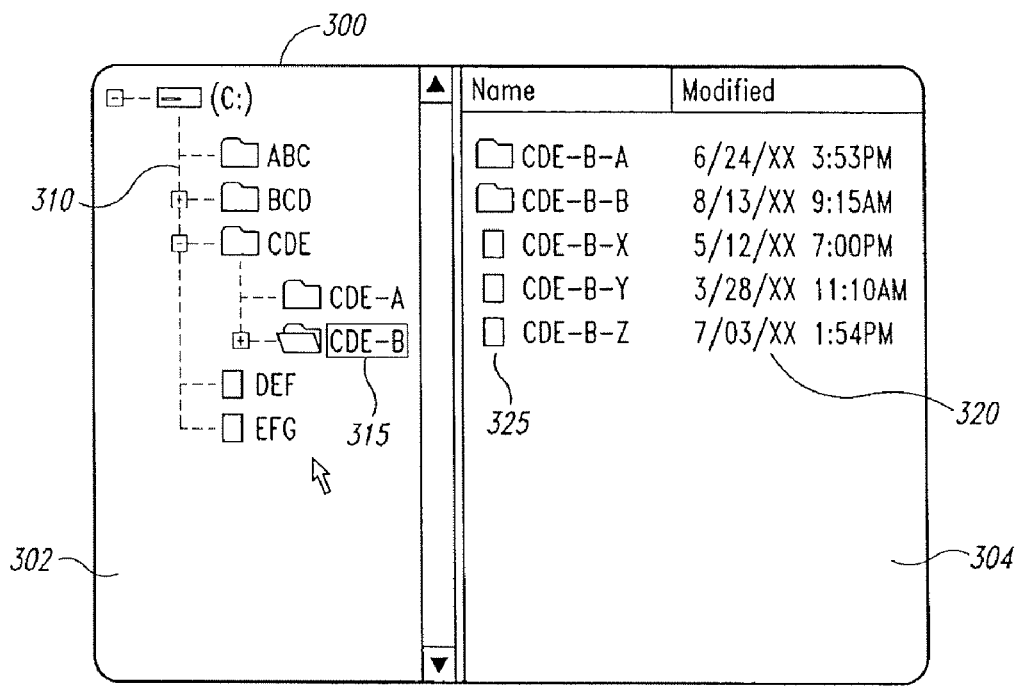
FIGS. 3A and 3B illustrate examples of common techniques for selecting a content group for display.
Figure 3B:
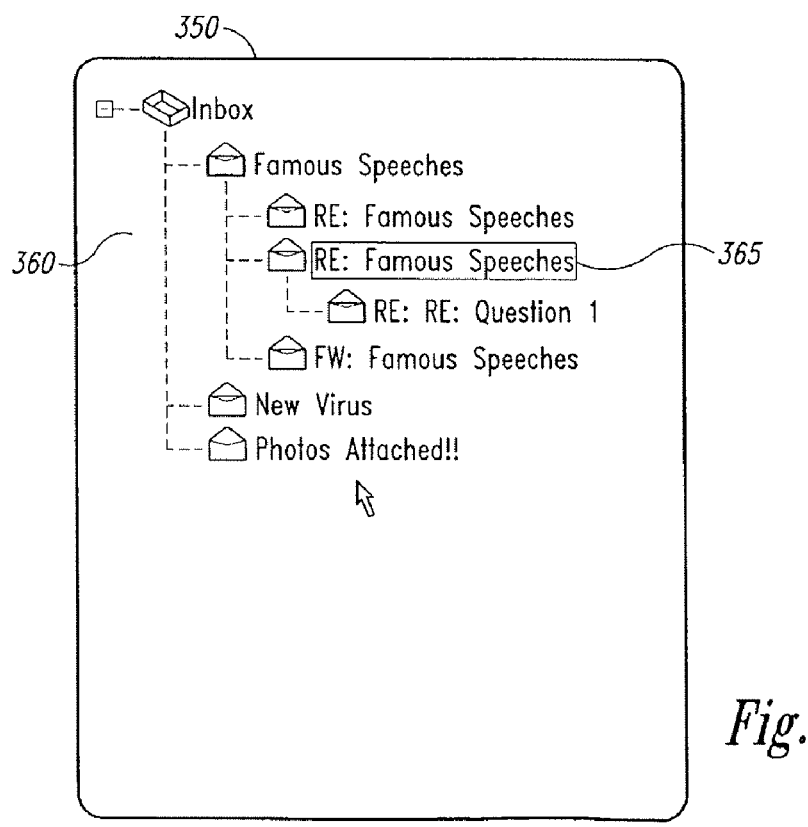

A method, system, and computer-readable medium for performing direct manipulation of displayed content is described. In some embodiments, a variety of types of direct manipulations of displayed content are provided in order to allow the user to modify the display of the content without the use of separate displayed content manipulation controls. For example, in some embodiments a cursor resembling a hand can be positioned over the displayed content, and based on one or more indications from the user, the hand can grasp the displayed content and manipulate the content in a variety of ways.

In addition, in some embodiments a user can perform a variety of types of direct manipulations of a container in which the displayed content is shown (e.g., a GUI window) in order to modify the container. In yet other embodiments, a separate displayed content control is provided that can be associated with displayed content in such a manner that direct manipulation of the content control will modify the display of the content in a corresponding manner. The simple metaphor of direct manipulation to modify displayed content or a content container provides a simple and efficient user interface that even novice users can easily understand and use.

In some embodiments, direct manipulation techniques are used to modify the display of content by altering the value of one or more content properties or attributes affecting the display. Different information types have a variety of such properties that can affect display of the information, For example, information types generally have an amplitude affecting the size or level with which the information is presented (e.g., a volume level at which audio information is played, or a size at which visual information is displayed).

Other properties affect the particular group of content to be displayed. For example, an information history property refers to a series of distinct groups of information that are related to each other over time. Also, some information types include a channel property that can specify one of multiple alternate channels, with each channel consisting of an alternative group of information that could be displayed. For example, a cable television stream may contain multiple alternate streams of video information, a music source (e.g., a radio or a CD) may contain multiple alternate songs, a transmitted telephone conversation may contain alternate groups of audio information corresponding to each participant, and a source of documents (e.g., a directory in a hierarchical directory structure, an email folder, or a Web page document having multiple links to other documents) may contain multiple alternate documents or collection of documents.

Each content type can have a particular type of direct manipulation be mapped to a particular property for that content type. For example, the selection of which group of information from a series of such groups in an information history is to be displayed may be selected by dragging the displayed content of a particular content type in a particular direction, or by dragging a particular part of the displayed content. When the user performs such a direct manipulation of the displayed content, the value of the property is modified accordingly, and the display of the content is updated to reflect the new value of the property. In some embodiments, the user can map what direct manipulations correspond to what properties. Those skilled in the art will appreciate that while content can be abstractly described as having various properties, in some embodiments such properties may not be explicitly represented as such by the underlying display mechanism or various values of a particular property may not be explicitly stored.

Figure 4A:
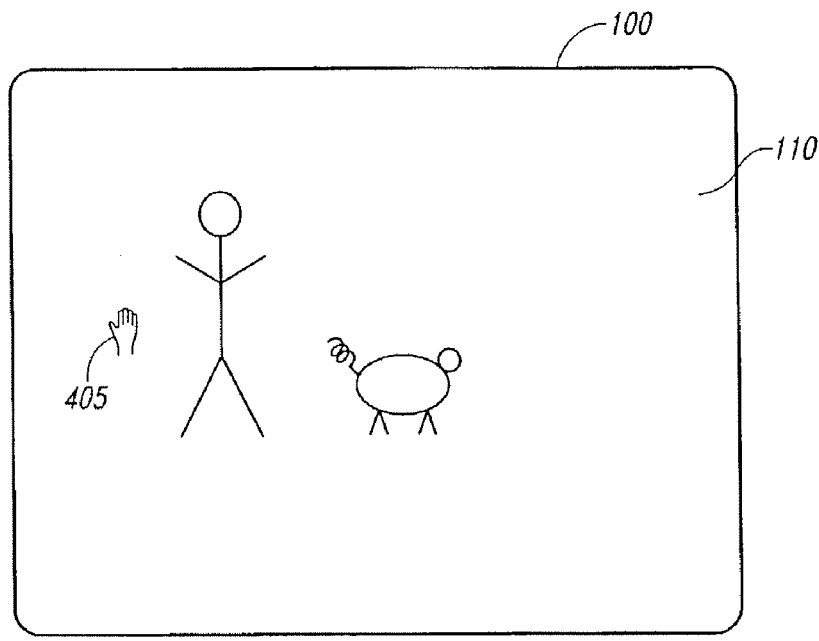
FIGS. 4A-4M illustrate examples of disclosed techniques for direct content manipulation of displayed content and of containers for displayed content.
Figure 4B:
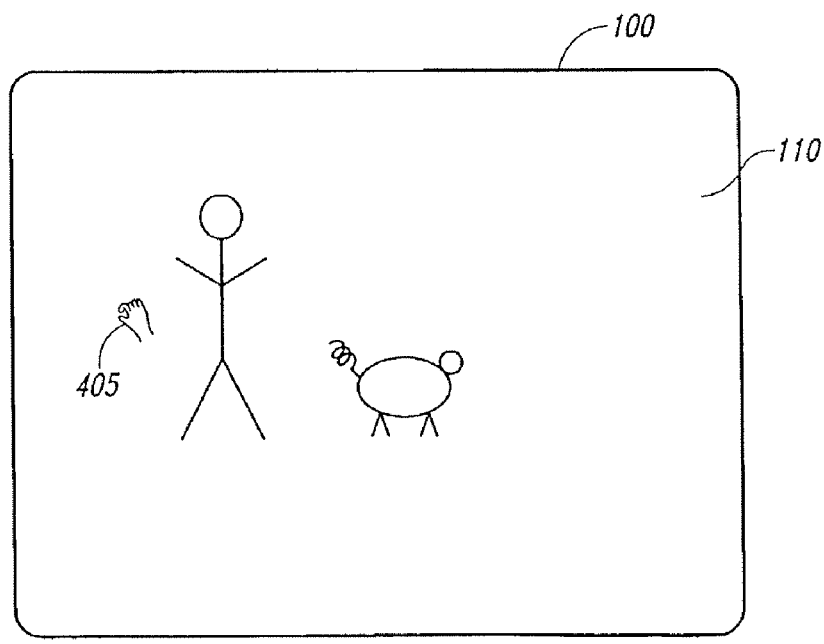

FIGS. 4A-4M illustrate examples of disclosed techniques for direct content manipulation of displayed content and of a container for the displayed content. In particular, FIG. 4A shows content group 110 displayed in window 100, and a cursor 405 is displayed over the content group. In the illustrated embodiment, the cursor is shown resembling a human hand in order to evoke the notion of direct grasping of the content by the user. In FIG. 4B, the user has indicated that a direct manipulation of the displayed content is beginning, and the cursor 405 has been modified to show a gripping hand as a visual indication that the direct manipulation is occurring. Those skilled in the art will appreciate that the indication of the beginning of the direct manipulation can occur in a variety of ways, such as by the user left-clicking the mouse or by pressing one or more keys on the keyboard.

Figure 4C:
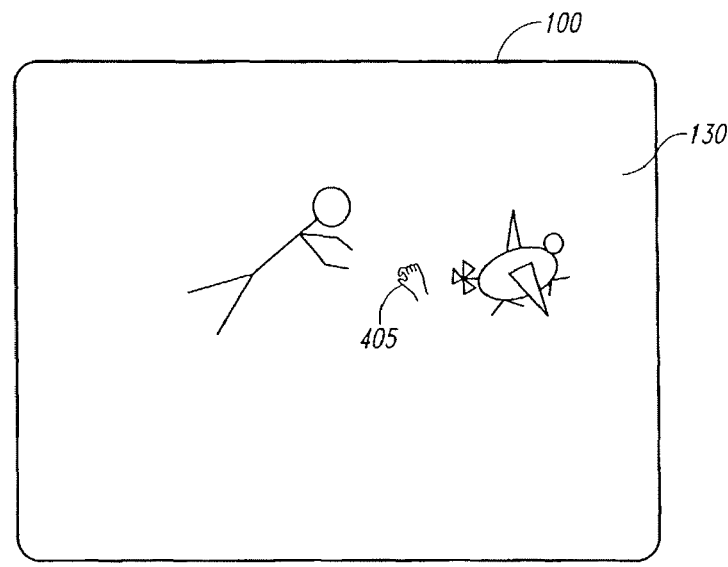
Figure 4D:
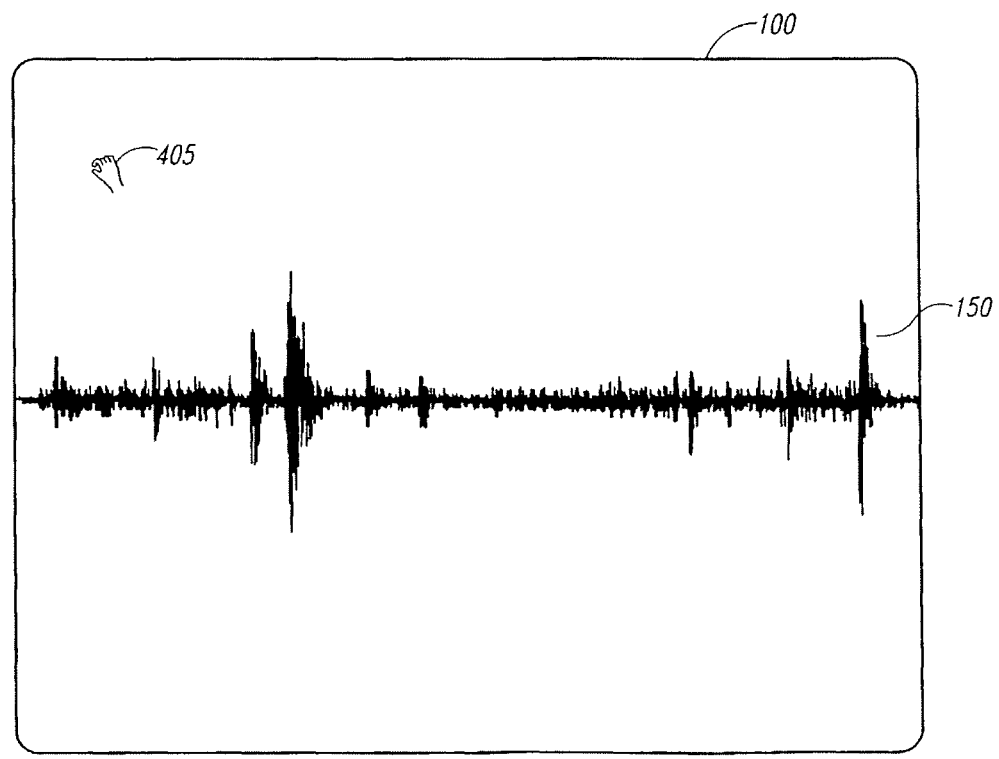
Figure 4E:
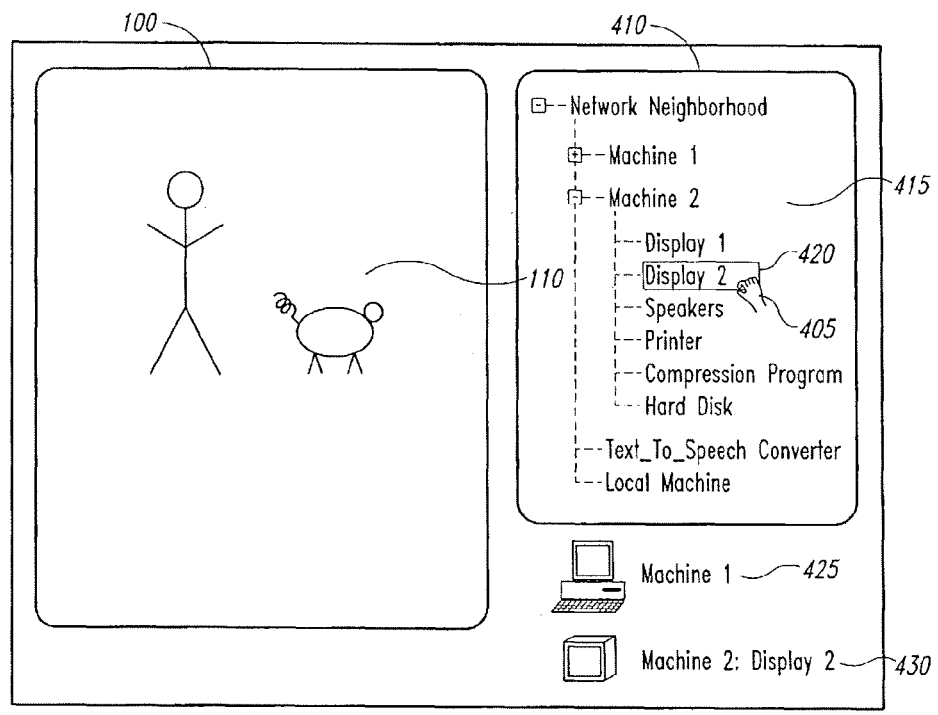

As indicated previously, some direct manipulations are specified by the manner in which the cursor is moved (e.g., the direction and distance of the move) after the direct manipulation begins. FIGS. 4C, 4D, and 4E show the ends of alternate direct manipulations that can be performed based on the direct manipulation that begins in FIG. 4B, as well as the effect on the content display of those manipulations.

For example, in FIG. 4C, the cursor has been moved in a lateral or horizontal motion to the right. In the illustrated embodiment, the direct manipulation of lateral movement corresponds to the property of content history, and movement toward the right corresponds to a later time in the history of the displayed content. Thus, the displayed content group 110 has been replaced with content group 130, which corresponds to a frame that is 2 frames later in the series of frames for the animated video clip. In the illustrated embodiment, the number of frames that are advanced depend on the distance of the lateral movement. Those skilled in the art will appreciate that in alternate embodiments, such a manipulation may instead be used only to select a next or previous related group of content in the history series. Those skilled in the art will also appreciate that in some embodiments, each frame in the series will be displayed as the moving cursor reaches a point on the display corresponding to that frame, while in other embodiments the display will only be modified to reflect the final result of the direct manipulation after the manipulation has ended.

In addition, the manner in which multiple groups of content can be mapped to a direct manipulation can vary. For example, in some embodiments, the mapping of distance moved by the cursor to content group may be linear (e.g., every inch of movement represents one content group), while in other embodiments non-linear mappings (e.g., exponential) may be used. In some embodiments, an inertia-based mapping is used as if the cursor had mass and the law of inertia applied, so that a relatively longer amount of movement is initially required to select a next content group (as if the cursor were beginning to gain momentum) but that successively smaller amounts of movement are required to select later content groups (as if the cursor had gained momentum and was moving with that momentum). In some such embodiments, the indication of the end of a direct manipulation causes immediate selection of the corresponding content group (as if the law of inertia was immediately removed), while in other embodiments the selected content group may reflect a location of the cursor that would occur if the cursor gradually slowed down from some achieved momentum.

In other embodiments, the selection of a new content group may be based on factors other than merely a direction and distance of movement during the direct manipulation. For example, some embodiments may support a variety of types of cursor movements that correspond conceptually to possible human movements other than a drag. For example, a throw motion may be modeled based on a rapid initial motion of the cursor, possibly followed by an abrupt stop. Such a motion may select a new content group that is a large number of content groups away, such as in the direction opposite of the movement. Those skilled in the art will appreciate that a variety of such motions are possible.

In addition, in the illustrated embodiment the new content group that was selected by the direct manipulation was based on a location of the new content group that is relative to the content group 110 (i.e., moving two frames forward rather than to the Xth frame in the total series). Thus, if the same direct manipulation was performed when content group 130 was displayed, a frame that is 2 frames later in the series of frames than content group 130 would be selected and displayed. Those skilled in the art will appreciate that in alternate embodiments, alternate methods of identifying the new content group can be used, such as based on an absolute location of the end point of the direct manipulation (e.g., if the direct manipulation stopped with a cursor is in the middle of the window, a frame in the middle of the series for the history of frames would be selected) or based on the distance of the movement in relation to the number of future frames (e.g., moving the cursor halfway across the window would select a frame halfway between the current frame and the last frame).

Those skilled in the art will also appreciate that the end of the direct manipulation can be performed in a variety of ways (e.g., by pressing one or more keys on the keyboard, or, if the direct manipulation begins with a left-click, when the initial left-click is released or when a second left-click occurs), and that the displayed icon for the cursor may revert to the originally displayed open hand cursor shown in FIG. 4A when the manipulation ends.

FIG. 4D illustrates an alternate type of direct manipulation that can occur based on the direct manipulation that began in FIG. 4B. In the illustrated embodiment, the direct manipulation of vertical or upwards movement corresponds to the channel property, and the animated video clip is one of multiple information streams supplied over a cable television wire. One of the alternate information streams for the current content feed is an audio information stream, and content group 150 is a visual representation of part of the audio stream. Thus, the vertical movement selects a new content group from the audio stream. In some embodiments, the content group in the audio information stream that is selected for display may correspond to the previous content group, such as at the same absolute time in the audio information stream as displayed content 110 was in the video stream (as if channels on a television were changed). In alternate embodiments, the presentation of the audio information stream may correspond to the same relative time as displayed content 110 (e.g., at 25% of the total amount of content available in that information stream), or may instead start at the beginning of the information for the stream.

As discussed above, there are a variety of ways of selecting the new content group to be presented, and a variety of ways in which the displaying of the new content group can be performed. Those skilled in the art will also appreciate that a particular direct manipulation can modify different properties in different situations, such as based on the type of content displayed, on the particular content group displayed, or on a different type of the same direct manipulation (e.g., pressing a key such as the Shift key simultaneously during a direct manipulation of a left-click depress, drag, and release rather than performing the direct manipulation without any key pressed). Conversely, the vertical direct manipulation may always correspond to the channel property, and the direct manipulation may have no effect if the current content does not have multiple channels.

FIG. 4E illustrates yet another type of direct manipulation that can occur based on the direct manipulation that began in FIG. 4B. In the illustrated embodiment, an additional window 410 is displayed simultaneously with window 100, and has displayed content 415 corresponding to a variety of currently accessible network devices and resources. In addition, icons 425 and 430 are also displayed, corresponding to network device Machine 1 and to the Display 2 resource on Machine 2 respectively. In the illustrated embodiment, dragging the displayed content group 110 over a visual representation of a network device or an available resource indicates the performance of a redirect such that the content group 110 will be sent to the selected device or resource for processing. In the illustrated embodiment, an available resource can be any device or program that can receive content information. For example, resources available on network device Machine 2 include output devices Display 1, Display 2, Speakers, and Printer, executing application program Compression Program, and the storage device Hard Disk. In addition to having resources supplied by a particular network device, the illustrated embodiment includes a stand-alone Text-To-Speech Converter network resource (e.g., a network device or an executing software program), and a logical representation of the local device on which the display is currently occurring.

After receiving the sent content group information, the destination device or resource will process the content group information in an appropriate manner. In the illustrated embodiment, sending video information to a display device indicates that the information is to be displayed on the device, sending the information to a storage device indicates that information is to be stored on that device (e.g., in a default or specified location), and sending the information to another output device type such as a printer or speakers indicates that the device should output information in a manner consistent with that device. When a particular device or resource (e.g., machine 2) supports multiple types of processing or manipulating of the content, the particular processing to be performed can be selected in a variety of ways. In some embodiments, a default type of processing will be provided for all content types (e.g., display the information on a primary display device), while in other embodiments the user may indicate what type of processing is to be performed (e.g., based on a key depressed during the manipulation or by responding to a query presented to the user) or the type of content may be used to determine an appropriate manner of display (e.g., sending audio information to speakers and visual information to a display device). If the content type is not consistent with the output device (e.g., text information sent to a speaker), the output device or an intermediary sender may attempt to translate the content into an appropriate format, or instead the output device may not accept the content. In addition, content can be sent to a resource that will accept the content as input and attempt to manipulate the content, such as the Compression Program or the Text-To-Speech Converter.

In addition, when redirecting displayed content to a new location, such as a display device for display, a variety of conversions and transmissions of the content may be necessary for the content to arrive at the destination device in an appropriate format for display. Those skilled in the art will appreciate that such conversions and transmissions can be performed in a variety of ways, such as those disclosed in U.S. patent application Ser. No. 09/304,973, entitled "METHOD AND SYSTEM FOR GENERATING A MAPPING BETWEEN TYPES OF DATA" and filed May 4, 1999, and U.S. patent application Ser. No. 09/474,664, entitled "METHOD AND SYSTEM FOR DATA MULTIPLEXING" and filed Dec. 29, 1999, which are each hereby incorporated by reference.

In the illustrated embodiment, the cursor 405 has dragged the displayed content group 110 over a visual representation 420 that indicates the Display 2 device on Machine 2. Thus, displayed content group 110 will be displayed on the Display 2 device. Those skilled in the art will appreciate that in some embodiments, the content group 110 will be copied to the new display device and thus will be simultaneously displayed in window 100 on the current display device and on the Display 2 device, while in alternate embodiments the content group 110 will be displayed on Display 2 device instead of in window 100. In addition, in some embodiments only the single frame containing the content group 110 will be directed to Display 2, while in alternate embodiments the rest of the frames of the video clip after that frame will be sent in succession to Display 2. In addition, those skilled in the art will appreciate that in some embodiments, all accessible network devices will be displayed as a possible destination for the current content group, while in alternate embodiments only those network devices to which the content group 110 can be sent will be displayed.

For some types of direct manipulations, the part of the displayed content that is selected at the beginning of the direct manipulation determines the type and effect of the manipulation. For example, with respect to FIG. 4D, if a new direct manipulation consisting of a downward vertical motion were performed, the effect of the manipulation may depend on where the manipulation was performed. If the beginning of the manipulation began at the location of the cursor 405 as shown in FIG. 4D, the manipulation may correspond to selection of a new channel. Conversely, if the beginning of the manipulation was made when the cursor was located over the upper part of the waveform, the manipulation may correspond to shrinking the size of the waveform (the volume of the audio information and/or the size of the visual representation). Thus, in some embodiments a particular portion of the displayed content may be manipulated rather than manipulating the entire group of displayed content as a whole.

Figure 4F:
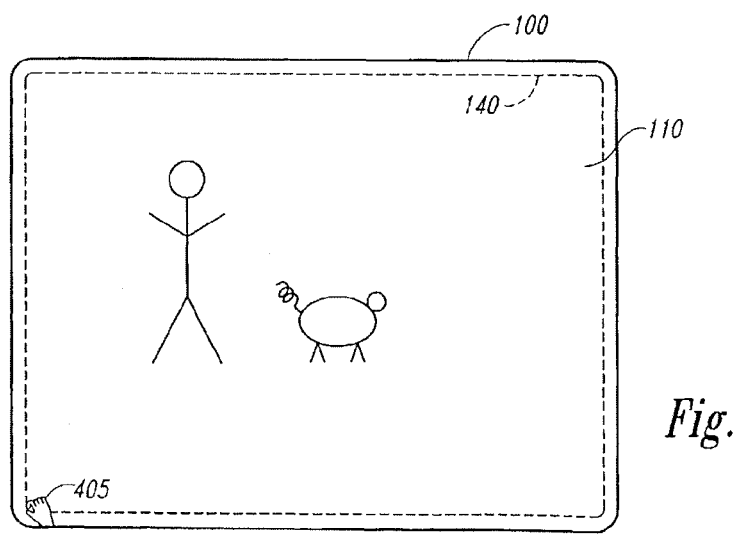

FIG. 4F illustrates a different type of direct manipulation in which the part of the displayed content that is selected at the beginning of the direct manipulation determines the type of manipulation. In particular, in some embodiments the container for the displayed content can be manipulated in ways that both modify the content to be displayed as well as modifying the manner in which the content is displayed. The container may be directly manipulated by selecting a portion of the container (e.g., a line surrounding the displayed content) for the beginning of the direct manipulation, or by instead selecting a portion of the content that is inside the container which is associated with the container (e.g., content just inside the edge of the container).

Figure 4G:
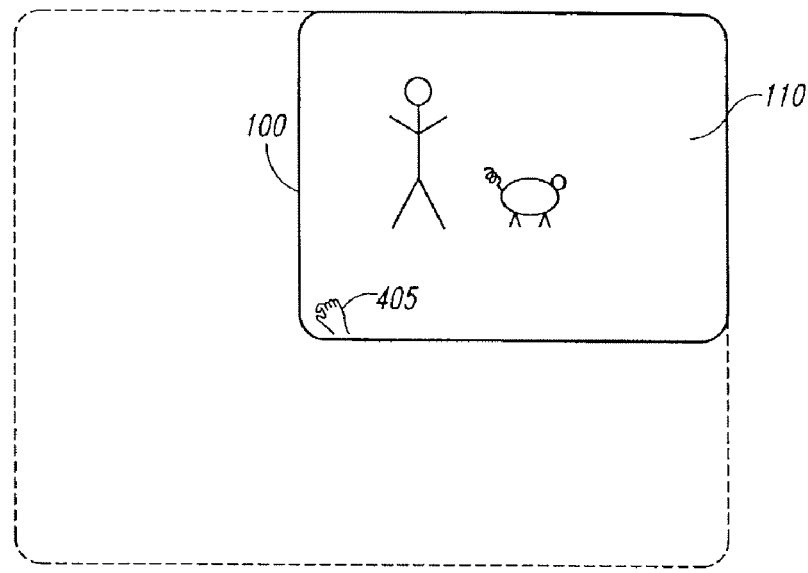
Figure 4H:
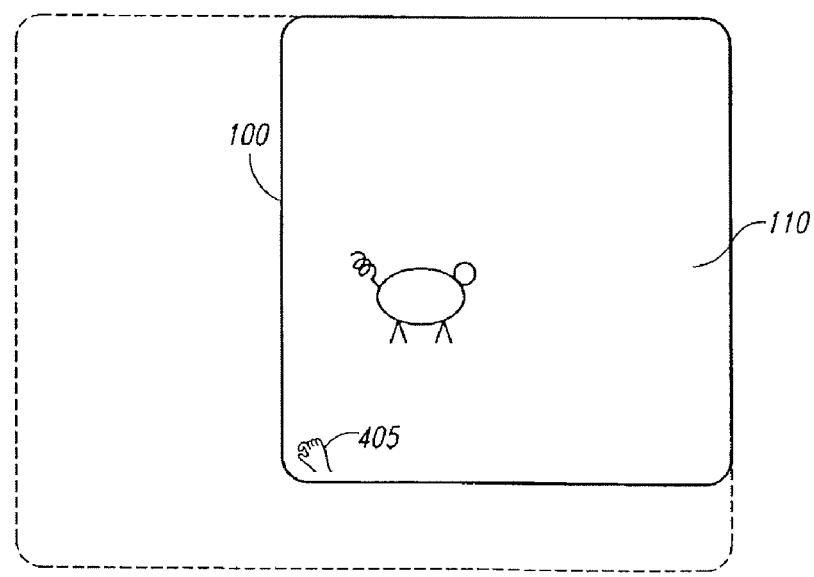

In the illustrated embodiment, a border 440 of the window 100 is shown consisting of the outside of the window and a small amount of interior content indicated by the dashed invisible line. In the illustrated embodiment, the border of the container (and thus the size and shape of the container) corresponds to the amplitude property. Thus, when the cursor is over the edge of the window or the displayed content corresponding to the border, the user indicates that a direct manipulation is beginning (as shown by the gripping hand cursor). The user then drags the border of the window up and to the right, ending at the location shown in FIG. 4G. As shown in FIG. 4G, this direct manipulation has the effect of reducing the size of window 100. Moreover, in the illustrated embodiment the value of the amplitude property is decreased in proportion to the reduction of the window size. Since the amplitude property for video information corresponds to the size at which the frames will be displayed, the content group 110 is shown at a proportionately reduced size (e.g., at a reduced zoom value). If the same direct manipulation were performed for window 100 containing audio information 150 displayed in FIG. 4D, in one embodiment the amplitude of both the visual representation of the audio information and the audible presentation of that information would be proportionately reduced. In alternate embodiments, such as that shown in FIG. 4H, this border drag manipulation may be associated with a different property, or with no property other than window size. Thus, if the border were dragged as shown in FIG. 4H, some embodiments may show the same content group at the same amplitude level, but with only part of the content group visible in the smaller window.

Figure 4I:
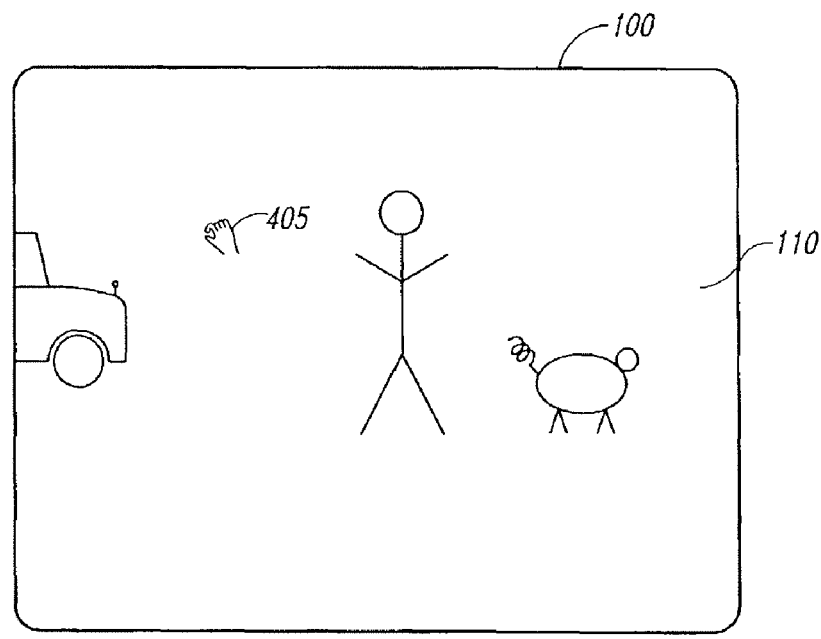
Figure 4J:
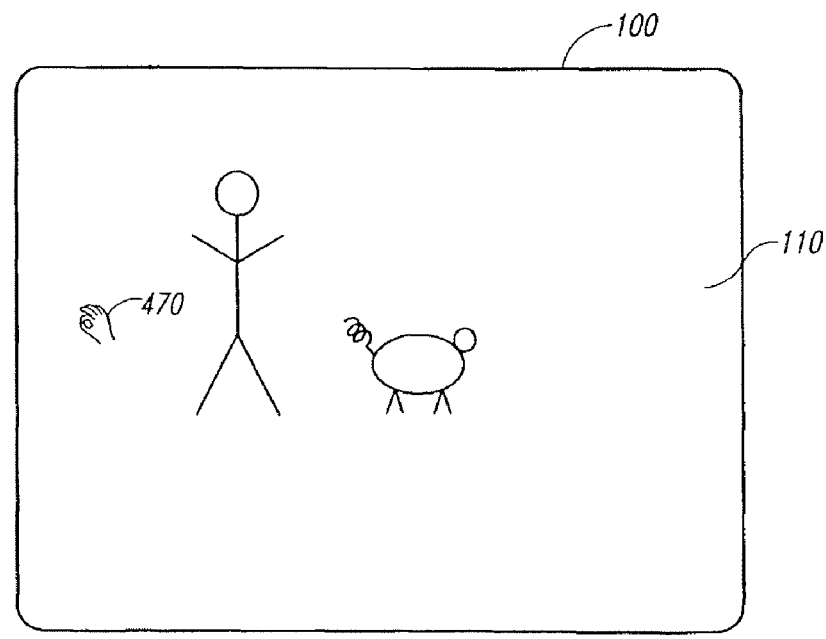

FIG. 4I illustrates another direct manipulation that can occur based on the direct manipulation that began in FIG. 4B. However, in the illustrated embodiment, only the rightmost portion of content group 110 is visible in FIG. 4B, with additional content group information to the left that is not visible. In the illustrated embodiment, the cursor 405 is moved in a similar manner to that shown in FIG. 4C. However, in the illustrated embodiment, a dragging direct manipulation will first scroll the displayed content group if possible (e.g., additional non-visible content group information is available in the direction opposite of the dragging) before modifying the history property. Thus, as shown in FIG. 4I, the cursor remains at the same relative position with respect to the displayed figures of the content group information, but additional content group information is dragged into the window from the left. In some embodiments, continuing the dragging to the right after all of the content group information to the left has been displayed will then result in a modification of the history property value.

As indicated previously, a given type of cursor movement can correspond to more than one type of direct manipulation, such as if a key is pressed during a left click for one type of direct manipulation but not for another. In some embodiments, when different types of direct manipulations are selected, different types of visually suggestive cursors are used to indicate the type of property that will be modified by the direct manipulation. For example, a different type of hand cursor 470 is displayed in FIG. 4J. This cursor may indicate a flicking motion such that movement of the cursor is not required to perform the manipulation—instead, the direction of the hand may indicate a direction in which the current content group will be sent upon completion of the direct manipulation. Thus, for example, performing the indicated direct manipulation may cause content group 120 (the next frame to the right) to be displayed, even without movement of the cursor.

Figure 4K:
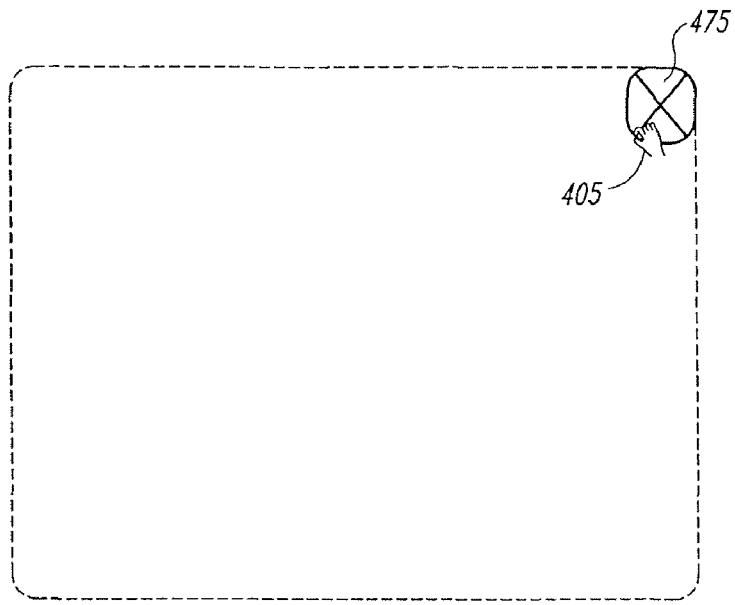

In FIG. 4K, another direct manipulation of a container holding displayed content is illustrated. In particular, in some embodiments the container for the displayed content can be closed by manipulating the size of the container to be sufficiently small (e.g., below a user-specified or automatically determined threshold). As is illustrated, if the direct manipulation that began in FIG. 4F continues farther up and to the right than was shown in FIG. 4G, eventually the window 100 will be shrunk below a certain size. When that occurs in the illustrated embodiment, the content 110 is replaced by content 475 to illustrate to the user that ending the direct manipulation with the window at that size will cause the window to be closed. Those skilled in the art will appreciate that other types of direct manipulations could instead be used to indicate that a window is to be closed.

Figure 4L:
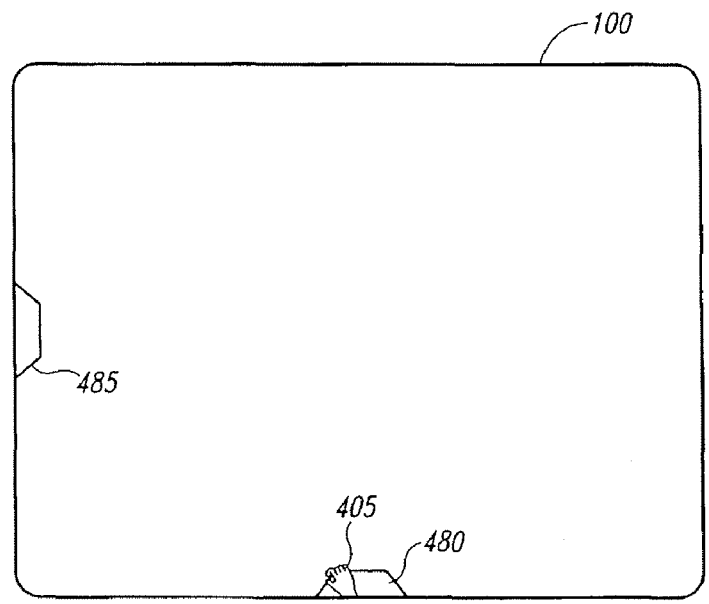
Figure 4M:
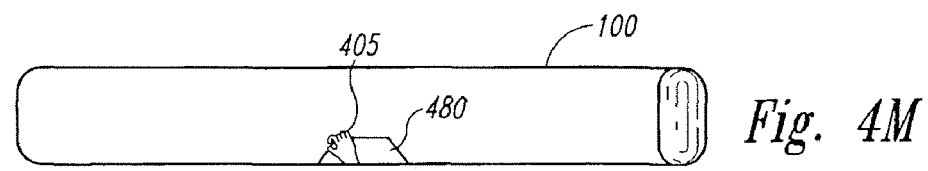

FIGS. 4L and 4M illustrate direct manipulation of a container holding displayed content in which the visual representation of the container is diminished so that less of the available display area is obscured (e.g., to be able to view another container behind the diminished container). In particular, in the illustrated embodiment the window 100 has additional container controls 480 and 485. Container control 480 represents a control such as those on a window shade or a projector screen that control the scrolling of those objects. After the user moves the cursor over the container control 480, the user can indicate that the window 100 is to be scrolled up into a diminished form. In some embodiments, this indication involves a direct manipulation of a quick tug of the control in the direction opposite of the scrolling (i.e., a tug downwards for the window to scroll upwards). After such a direct manipulation has been performed on control 480, the window 100 will be modified into a diminished form such as is shown in FIG. 4M. In some embodiments, intermediate states of the window will be displayed as the scrolling occurs, while in other embodiments the full-sized window will merely be replaced by the diminished form of the window.

In an analogous manner, the diminished form of the window 100 in FIG. 4M can be expanded into the full-sized window by placing the cursor over the control 480 and performing a direct manipulation to expand the window. In some embodiments, the appropriate direct manipulation may be a short tug in the direction of expansion of the window (i.e., a tug downwards for the window to scroll down), while in other embodiments the direct manipulation will be dragging the control 480 and the bottom of the window downward until a desired expanded window size is reached. Those skilled in the art will appreciate that a variety of types of direct manipulation can be used to diminish and expand a window, and that a diminished window can be visually represented in a variety of ways. In addition, in some embodiments separate container controls may not be displayed, and such manipulations may instead be performed directly on the container (e.g., on the border or edge of the container).

In some embodiments, a window can be diminished in any direction. For example, window 100 in FIG. 4I, includes container control 485. If control 485 is directly manipulated in the appropriate manner to diminish the window (e.g., a quick tug to the left), the window will scroll to the right and be shown in a vertical diminished form along the right side of the window. In a similar manner, the window could be scrolled downwards or to the left by selection of appropriate container controls (not shown) of the window.

Those skilled in the art will appreciate that a variety of types of direct manipulations are possible, and that a variety of types of properties can be manipulated. The specific direct manipulations and properties shown with respect to FIGS. 4A-4M are not intended to limit the scope of the present invention.

Figure 5:
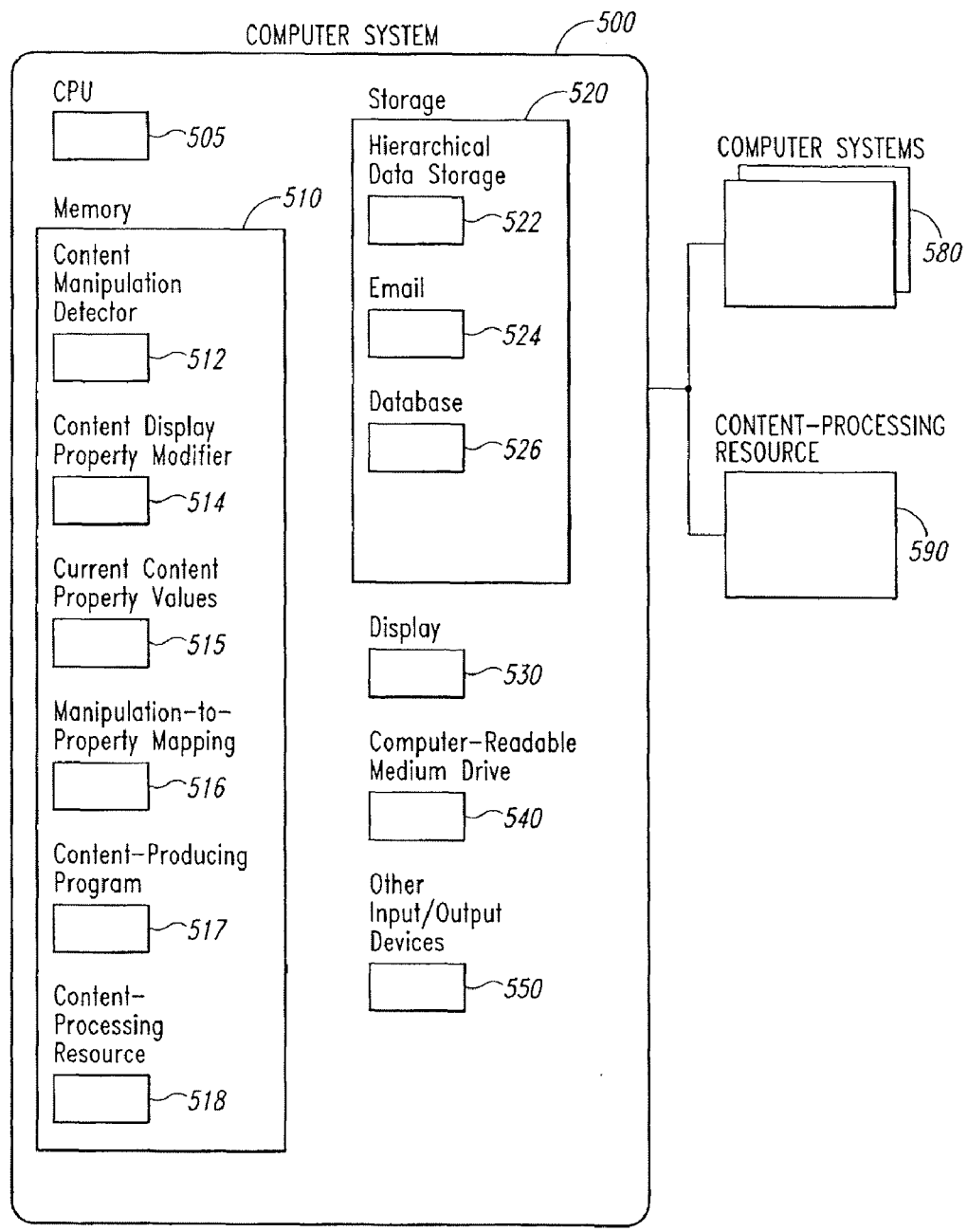
FIG. 5 is a block diagram illustrating an embodiment of a system for performing direct content manipulation of displayed content.

FIG. 5 is a block diagram illustrating an embodiment of a system for performing direct content manipulation of displayed content or a displayed content container. In particular, computer system 500 contains a CPU 505, memory 510, storage 520, a display 530, a computer-readable medium drive 540, and other input/output devices 550. Computer system 500 can communicate with other network-accessible computer systems 580, as well as with a network-accessible content-processing resource 590. A current group of content is displayed in a window on the display 530 (not shown), and a Content Manipulation Detector 512 and Content Display Property Modifier 514 executing in the memory receive indications of direct content manipulations by the user and modify associated content and container properties accordingly.

In particular, when the Content Manipulation Detector receives an indication of user input, it determines whether the user input is a type of direct manipulation. If so, it notifies the Content Display Property Modifier of the received direct manipulation. The Content Display Property Modifier then determines the content property associated with the direct manipulation, such as by using stored manipulation-to-property mappings 516. The Content Display Property Modifier next determines a new value for the property based on the amount and direction of the manipulation. The Content Display Property Modifier then stores the new property value with the current content property values 515, and updates the presentation of the content on the display.

When determining an initial group of content to be displayed, or when selecting a new group of content based on a direct manipulation, a variety of types of content are available including hierarchical data storage 522, email messages 524, and database information 526, all stored on the storage device. Alternately, a content feed could be received from a variety of other sources, such as a network-accessible device or an executing program 517 in memory that is producing various content.

If a direct manipulation indicates that the current content is to be redirected to an output device or resource other than display 530, a variety of available devices and resources may be selected such as executing content processing resource 518 in the memory, the content processing resource 590 available via the network, one of many available network-accessible computer systems 580, or a variety of particular resources available on the network-accessible computer systems (not shown).

Those skilled in the art will appreciate that computer system 500 is merely illustrative and is not intended to limit the scope of the present invention. For example, the Content Manipulation Detector and Content Display Property Modifier may be stored as instructions on a computer-readable medium, such as a hard disk, memory, or portable media article to be read by an appropriate drive. Similarly, any data structures created or used, such as the mapping from direct manipulations to properties, may similarly be stored on a computer-readable medium. Moreover, such instructions and data structures can also be transmitted as generated data signals on a variety of computer-readable transmission mediums, including wireless-based and wired/cable-based mediums. Computer system 500 may also contain additional components or may lack some illustrated components, and may be connected to other devices in a variety of manners, including through a network, through the Internet, or via the World Wide Web (WWW). Accordingly, the present invention may be practiced with other computer system configurations.

Figure 6:
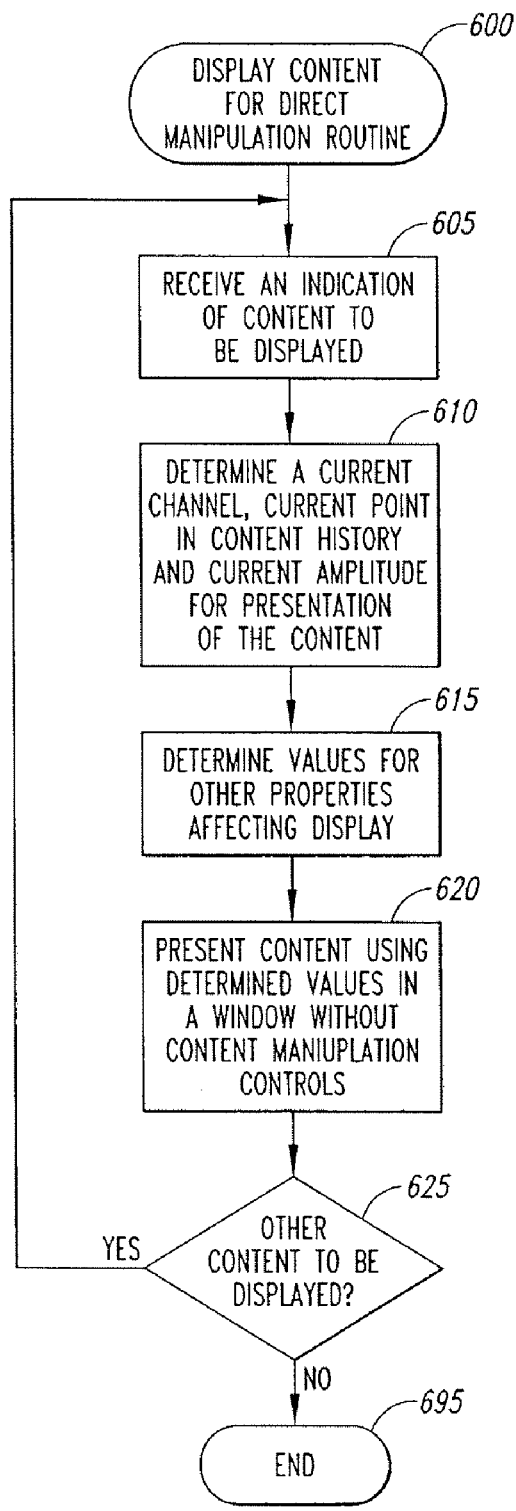
FIG. 6 is a flow diagram of an embodiment of the Display Content For Direct Manipulation routine.

FIG. 6 is a flow diagram of an embodiment of the Display Content For Direct Manipulation routine 600. The routine receives an indication of content to be displayed, and displays at least a portion of the content group in a window without separate displayed content manipulation controls. The routine begins at step 605 where it receives an indication of content to be displayed. The routine then continues to step 610 where it determines a current channel for the content if there are multiple channels, determines the current content group in the content history if there is a series of multiple groups available, and determines a current amplitude for presentation of the content group. The routine then continues to step 615 where it optionally determines current values for other properties of the content group that affect the display. The routine then continues to step 620 where it presents the current content group using the determined property values in a window without separately displayed content manipulation controls. The routine next continues to step 625 to determine if there is other content to be displayed. If so, the routine returns to step 605, and if not, the routine continues to 695 and ends.

Those skilled in the art will appreciate that other embodiments may vary in a variety of ways from the illustrated routine, such as by having different properties which affect the display of the content. In addition, the values for the various properties can be determined in a variety of ways, such as by using default values, by using previously expressed user preferences, by interactively querying the user, or by automatically determining appropriate values. Those skilled in the art will also appreciate that in some embodiments, the content will be displayed in a window having some separate displayed content manipulation controls which can be used to modify the display of the content in addition to the direct content manipulations. In addition, those skilled in the art will also appreciate that a variety of groups of content may be simultaneously displayed in different windows, or in different panes of a single window.

Figure 7:
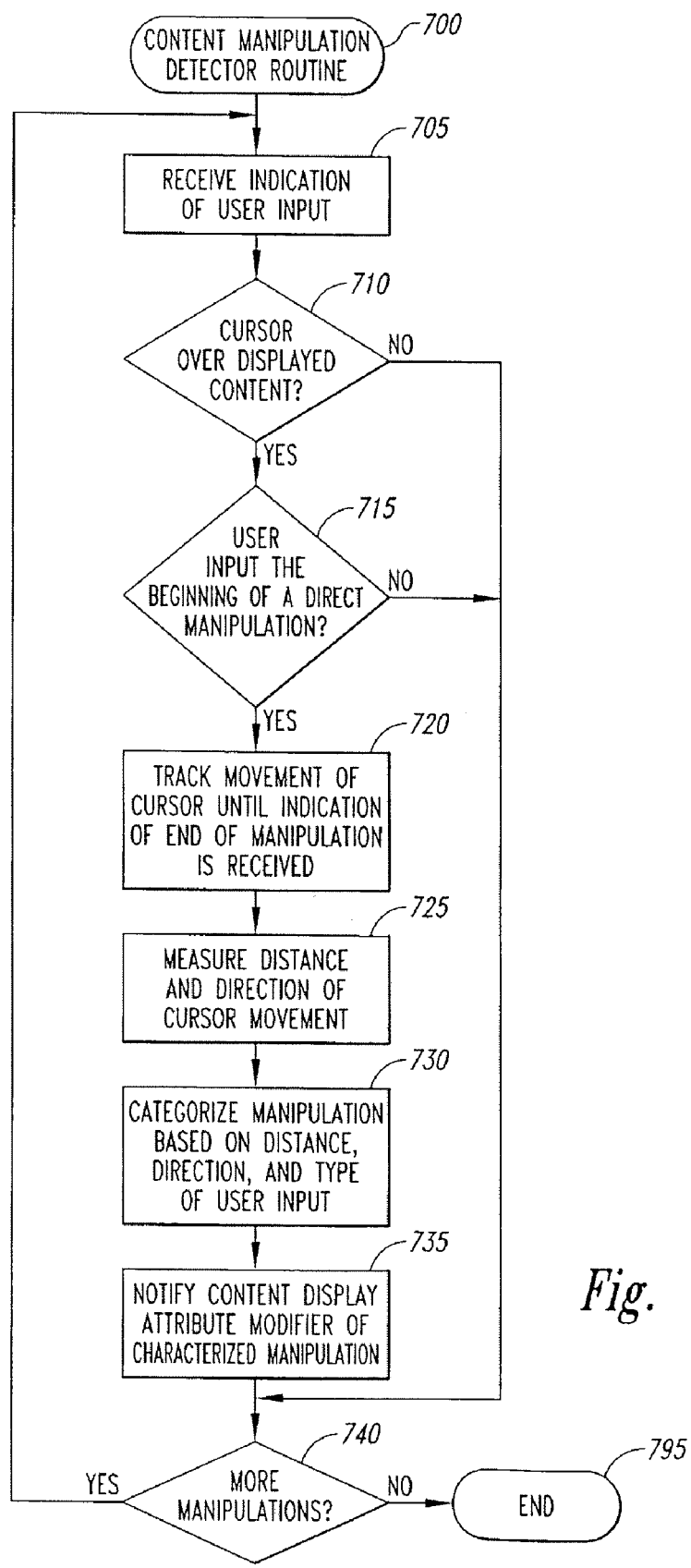
FIG. 7 is a flow diagram of an embodiment of the Content Manipulation Detector routine.

FIG. 7 is a flow diagram of an embodiment of the Content Manipulation Detector routine 700. The routine receives an indication of user input, determines whether the user input is a direct manipulation of displayed content, and if so, characterizes the type of direct manipulation and provides the information to the Content Display Property Modifier. The routine began at step 705 where an indication of user input is received. The routine then continues to step 710 to determine whether the cursor is over displayed content enabled for direct manipulation. If so, the routine continues to step 715 to determine whether the user input is an indication of the beginning of a direct manipulation. Those skilled in the art will appreciate that a variety of types of user input can indicate the beginning of a direct manipulation, such as a particular type of click of a mouse, pressing of one or keys of the keyboard, a particular type of voice input, etc. In addition, those skilled in the art will appreciate that if manipulations of the container are to be detected, step 710 may also detect whether the cursor is over a portion of the container or a part of the displayed content corresponding to the container.

If it is determined in step 715 that the user input is the beginning of a direct manipulation, the routine continues to step 720 to note the location of the cursor at the beginning of the direct manipulation and to track the movement of the cursor until an indication of the end of the direct manipulation is received. Those skilled in the art will appreciate that a variety of types of user inputs can indicate the end of a direct manipulation. In addition, those skilled in the art will appreciate that a cursor can be moved in a variety of ways and that indication of user inputs and of a movement of the cursor can be detected in a variety of ways, such as by monitoring information provided to the operating system by various user input devices.

After step 720, the routine continues to step 725 to measure the distance and direction of the cursor movement. The routine then continues to step 730 to characterize the type of direct content manipulation based on the distance, direction, and type of user input. As discussed above, a variety of types of user input can be used to indicate different types of direct manipulations. The routine next continues to step 735 to notify the Content Display Property Modifier of the characterized manipulation, including the measured distance and direction. After step 735, or if it was instead determined in step 710 that the cursor is not over displayed content or in step 715 that the user input is not the beginning of a direct manipulation, the routine continues to step 740 to determine if more direct manipulations are to be detected. If so, the routine returns to step 705, and if not the routine continues to step 795 and ends.

Those skilled in the art will appreciate that a variety of types of direct manipulations may be detected and tracked, including those that do not involve movement or other manipulation of a cursor. In addition, in some embodiments the cursor is modified during direct manipulations of displayed content, such as from an open hand cursor to a gripping hand cursor. In addition, in some embodiments a variety of types of direct manipulations of a displayed content container may be detected and reported to the Content Display Property Modifier, and other factors may be used to characterize the type of direct manipulation such as the beginning and ending locations of the cursor during the direct manipulation and the part portion of the displayed content that the cursor is over during the manipulation.

Figure 8:
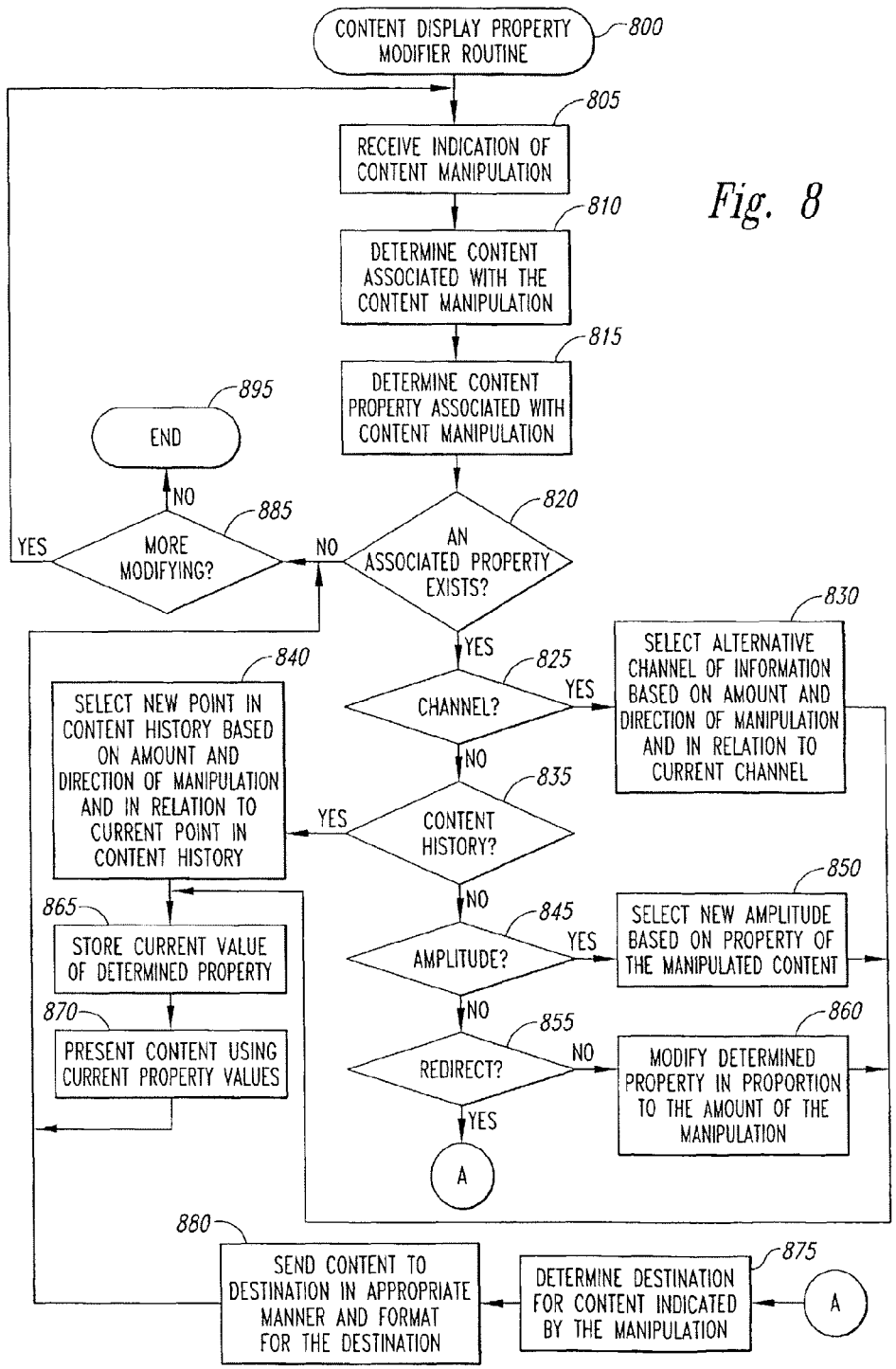
FIG. 8 is a flow diagram of an embodiment of the Content Display Property Modifier routine.

FIG. 8 is a flow diagram of an embodiment of the Content Display Property Modifier routine 800. The routine receives an indication of a direct content manipulation made by a user, determines the type of content property that is to be modified and the amount of the modification, performs the modification of the property, and presents the content using the modified property values. The routine begins at step 805, where an indication of a direct content manipulation by a user is received. The routine continues to step 810 to determine the content associated with the direct manipulation. The routine then continues to step 815 to determine the content property that is associated with the direct content manipulation. Those skilled in the art will appreciate that in some embodiments direct manipulations of a content container may also be detected.

The routine next continues to step 820 to determine if a property exists that is associated with the direct content manipulation. Those skilled in the art will appreciate that a variety of reasons may exist why no property is associated with a detected direct content manipulation, such as that no such direct manipulation is currently defined or that the direct manipulation is associated with a property that does not exist for the current content group. In the illustrated embodiment, an associated property will be determined in step 820 only if the current content group supports that type of property. Those skilled in the art will also appreciate that a variety of types of ways of determining a property associated with a direct content manipulation exist, such as by using a predefined mapping, a user-specified mapping, or by allowing a separate routine responsible for display of the type of current content group to determine the associated property.

If it is determined in step 820 that an associated property does exist, the routine continues to step 825 to determine if the property is the channel property. If so, the routine continues to step 830 to select an alternative channel of information from the current content based on the amount and direction of the manipulation and in relation to the current channel. Those skilled in the art will appreciate that an alternate channel can be selected in a variety of other ways, such as based only on the direction of the manipulation or in a manner that is not relative to the current channel. If it was instead determined in step 825 that the current property is not the channel property, the routine continues to step 835 to determine if the current property is the content history property. If so, the routine continues to step 840 to select a new group of content from the series of content groups in the history for the current content, with the selecting based on the amount and direction of the direct manipulation and in relation to the current value of the content history. As with the channel property, those skilled in the art will appreciate that an alternate point in history can be selected in a variety of other ways. If it was instead determined in step 835 that the current property is not the content history property, the routine continues to step 845 to determine if the current property is the amplitude property. If so, the routine continues to step 850 to select a new amplitude value based on an absolute property of the manipulated content group, such as a new size of the window in which the content group is displayed. Those skilled in the art will appreciate that an alternate amplitude value can be selected in a variety of other ways.

If it is instead determined in step 845 that the current property is not the amplitude property, the routine continues to step 855 to determine if the property is to redirect the current content group to another device or resource. If not, the routine continues to step 860 to modify the determined property in proportion to the amount and direction of the manipulation. Those skilled in the art will appreciate that a variety of other types of content properties may be modified, such as an amount of scrolling of the displayed content when only part of the current content group is displayed, the amount of zoom of the displayed information, or a user history of a series of previously displayed content groups selected by the user rather than predefined for the content. Similarly, those skilled in the art will appreciate that a variety of types of content container properties may be modified, such as the size of the container, whether the container is to remain open or not, whether the container is displayed in a full manner or a reduced manner (e.g., only the upper border of the window, or only an icon representing the window in a task bar), etc. After steps 830, 840, 850, or 860, the routine continues to step 865 to store the current determined value of the determined property. The routine then continues to step 870 to present the current content group using the current property values.

It was instead determined in step 855 that the determined property is to redirect the current content group to a new device or resource, the routine continues to step 875 to determine the destination device or resource that is indicated by the manipulation. For example, the routine can determine the end point of the cursor movement, and determine what device or resource has a visual representation below that end point. After step 875, the routine continues to step 880 to send the current content group to the destination in an appropriate manner and format for the destination to be able to process the content group. Those skilled in the art will appreciate that there are a variety of ways to transmit a content group to a destination, and a variety of ways in which to format the transmission. After steps 870 or 880, or if it was instead determined in step 820 that an associated property does not exist, the routine continues to step 885 to determine whether to continue modifying content properties. If so, the routine returns to step 805, and if not, the routine ends at step 895. Those skilled in the art will appreciate that there are a variety of ways to determine new values for content properties, and that there are a variety of content properties that can be modified.

Figure 9:
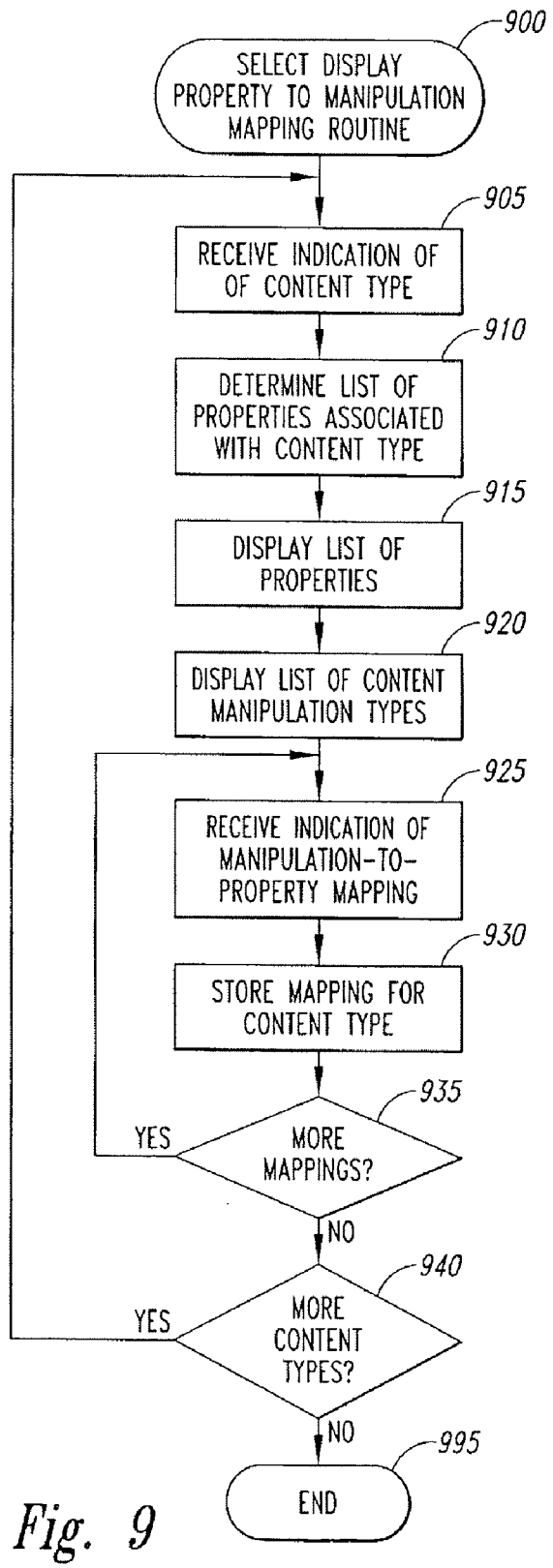
FIG. 9 is a flow diagram of an embodiment of the Select Display Property To Manipulation Mapping routine.

FIG. 9 is a flow diagram of an embodiment of the Select Display Property To Manipulation Mapping routine 900. For each of a variety of content types, the routine establishes mappings between types of direct content manipulation and content properties for the content type by displaying indications of possible types of direct manipulation and possible properties, and allowing the user to designate mappings between the manipulation types and properties. The routine begins at step 905 where an indication is received of a content type for which mappings will be defined. The routine then continues to step 910 to determine a list of possible content properties associated with the content type, and then to step 915 to display a list of those properties. The routine then continues to step 920 to display a list of possible direct content manipulation types for the current user interface. The routine then continues to step 925 to receive an indication of a mapping between a manipulation and a property. The routine next continues to step 930 to store the indicated mapping for the current content type. At step 935, the routine then determines if there are more mappings to be defined for the current content type. If so, the routine returns to step 925, and if not the routine continues to step 940. At step 940, the routine determines if there are more content types for which mappings are to be defined. If so, the routine returns to step 905, and if not the routine continues to step 995 and ends.

Those skilled in the art will appreciate that there are a variety of other ways to define mappings between direct manipulation types and content properties, such as based on a particular group of content rather than by content type, by allowing automatic determination of mappings between manipulations and properties, or by using the same mappings for all content types even if the current content type does not support one or more of the mapped properties. Those skilled in the art will appreciate that mappings can be defined in other ways, such as mapping direct manipulation types to properties of content containers. Those skilled in the art will also appreciate that mappings can be stored in a variety of ways, such as in a table or database indexed by content type.

In some embodiments, a content control that is separate from displayed content is provided. After the content control is associated with particular displayed content (e.g., with one of multiple containers each holding displayed content), a variety of types of direct manipulations of the content control will cause corresponding manipulations of the associated displayed content.

Figure 10A:
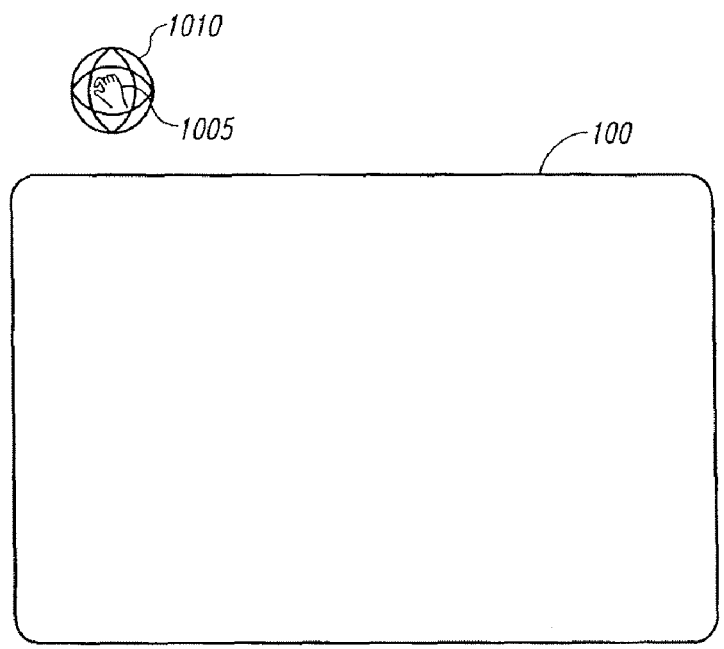
FIGS. 10A-10E illustrate examples of disclosed techniques for manipulation of displayed content via direct manipulation of a displayed content control.

In particular, FIGS. 10A-10E illustrate examples of disclosed techniques for manipulation of displayed content via direct manipulation of a displayed content control. In FIG. 10A, a ball-shaped content control 1010 is displayed separately from window 100 holding displayed content (not shown). In addition, other windows (not shown) may be displayed holding other displayed content. The content control can be associated with displayed content (e.g., with a particular window) in a variety of ways, such as having the content control always associated with a currently selected window or by a specific direct manipulation of the content control to associate it with a particular window. After the content control is associated with displayed content, direct manipulations of the content control (e.g., by using cursor 1005) will modify the associated displayed content.

Figure 10B:
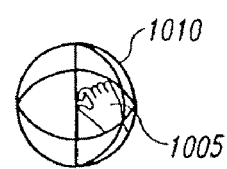
Figure 10C:
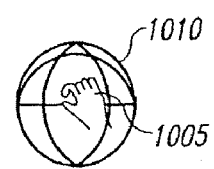

In particular, FIGS. 10B-10E illustrate various possible direct manipulations of the content control. If the cursor begins a direct manipulation of the content control from the center of the control as shown in FIG. 10A, one possible direct manipulation is to rotate the content control in a lateral motion as shown in FIG. 10B. In some embodiments, such a lateral rotation may be equivalent to directly dragging the displayed content in a lateral motion, such as to select new content group from a series of such groups for the content history. As an alternate direct manipulation of the content control beginning in the position shown in FIG. 10A, the content control can be rotated in a vertical motion as shown in FIG. 10C. In some embodiments, such a vertical rotation may be equivalent to directly dragging the displayed content in a vertical motion, such as to select a new channel for the displayed content.

Figure 10D:
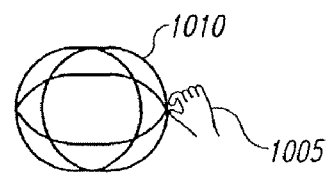
Figure 10E:
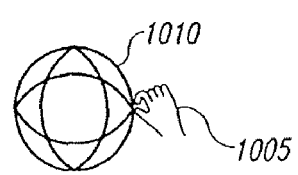

Direct manipulations of the content control other than rotating are also possible. For example, as shown in FIG. 10D, the content control may be grabbed and pulled. In the illustrated embodiment, the control is stretched by the pulling, while in other embodiments the control may move when it is pulled. Similarly, as is shown in the FIG. 10E, the content control may be pushed in a particular direction. In the illustrated embodiment, the control moves when it is pushed, while in alternate embodiments the control may be compressed. Those skilled in the art will appreciate that in some embodiments, such as that shown in FIG. 10E, the visual representation of the cursor may be modified to indicate the type of direct manipulation being performed.

Those skilled in the art will appreciate that a variety of other types of direct manipulations can also be performed, such as depressing the content control or throwing the content control. In addition, those skilled in the art will appreciate that a variety of types of modifications to the displayed content or to the content container can be associated with such manipulations, such as modifying the amplitude at which the displayed content is presented, modifying the size of the container, closing the container, modifying the view of the container so that it is displayed in a diminished form or expanded form, etc.

Figure 11:
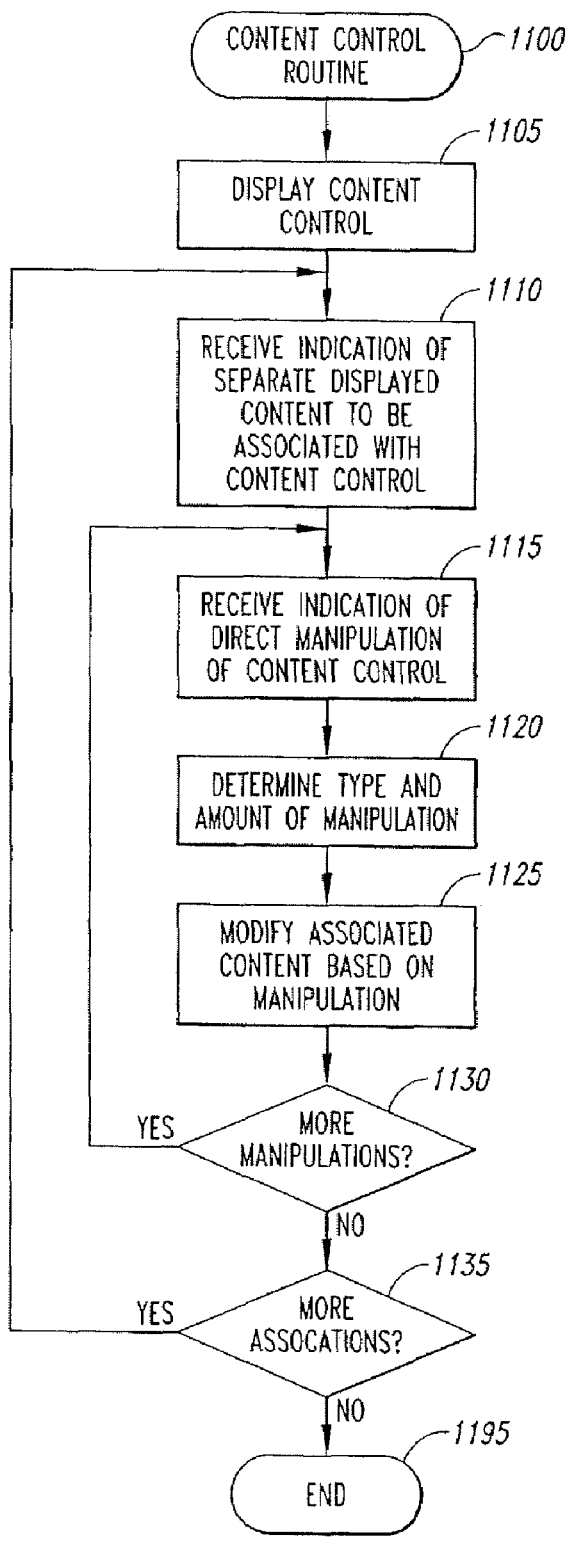
FIG. 11 is a flow diagram of an embodiment of the Content Control routine.

FIG. 11 is a flow diagram of an embodiment of the Content Control routine 1100. The routine associates a content control with displayed content, receives indications of one or more direct manipulations of the content control, and modifies the associated displayed content in a manner consistent with the direct manipulation. The routine begins at step 1105 where it displays the content control. The routine continues to step 1110 where an indication of an association between the content control and displayed content is made. The routine then continues to step 1115 to receive an indication of a direct manipulation of the content control. In step 1120, the routine determines the type and amount of the direct manipulation of the content control, and in step 1125 the routine modifies the associated displayed content based on the direct manipulation. The routine then continues to step 1130 to determine if more direct manipulations of the content control are to be made. If so, the routine returns to step 1115, and if not the routine continue to step 1135. In step 1135, the routine determines if other displayed content is to be associated with the content control. If so, the routine returns to step 1110, and if not the routine continues to step 1195 and ends.

Those skilled in the art will appreciate that a variety of types of direct manipulations of the content control can be made, and that in some embodiments direct manipulations of the content control may modify a container for the displayed content rather than the displayed content itself.

From the foregoing it will be appreciated that, although specific embodiments have been described herein for purposes of illustration, various modifications may be made without deviating from the spirit and scope of the invention. Accordingly, the invention is not limited except as by the appended claims.

The embodiments of the invention in which an exclusive property or privilege is claimed are defined as follows:

1. A computer-implemented method for controlling display of information based on direct manipulation of the displayed information without use of separate manipulation controls, the information having multiple channels each representing an alternative stream of groups of information available for display, having a history including a series of previously displayed groups of information, and having multiple amplitudes at which the information can be displayed, the method comprising:
    receiving an indication of the information to be displayed;
    determining a current channel of the information, a current group of information from the stream associated with the current channel, and a current amplitude;
    displaying the current portion of the information at the current amplitude; and
    for each of a series of received indications that a user has dragged the displayed information,
        when the user has dragged the displayed information in a predefined direction associated with the channels, displaying a group of information from the stream associated with a new channel, the new channel selected based on the dragging;
        when the user has dragged the displayed information in a predefined manner associated with the amplitudes, displaying the current group of information at a new amplitude, the new amplitude selected based on the dragging; and
        when the user has dragged the displayed information in a predefined direction associated with the history, displaying a new group of information from the series of groups of information, the new group selected based on the dragging, so that the user can directly manipulate the display of information without the use of separate manipulation controls.

2. The method of claim 1 wherein a distance of the dragging of the displayed information determines the selection of the new channel, new amplitude, or new group.

3. The Method of claim 1 wherein an indication of a distinct output device is displayed, and including:
    receiving an indication that the user has dragged the displayed information to the displayed indication of the output device; and
    in response, displaying the displayed information on the output device.

4. The method of claim 1 wherein when a previously displayed group of information from the series for the history is selected as the current group of information, groups of information later in the series are removed from the history.

5. The method of claim 1 wherein the direction of the dragging that is associated with the history is a lateral direction.

6. The method of claim 1 wherein the direction of the dragging that is associated with the channels is a vertical direction.

7. The method of claim 1 wherein the dragging of the displayed information that is associated with the amplitude involves modifying a size of a window in which the information is displayed.

8. The method of claim 1 wherein each channel is a video stream consisting of a series of images and wherein the amplitude at which the information is displayed corresponds to a size of the displayed images for the current channel.

9. The method of claim 1 wherein each channel is an audio stream and wherein the amplitude at which the information is displayed corresponds to an audio level at which the audio information is played.

10. The method of claim 1 wherein the information is displayed inside a displayed container, and including:
    receiving an indication that the user has dragged a portion of the container; and
    modifying a visual representation of the container based on the dragging.

11. The method of claim 10 wherein the container is a window.

12. The method of claim 10 wherein the dragging of the container modifies the size of the container, and including displaying the displayed content in the modified container at a new amplitude corresponding to the modified size.

13. The method of claim 10 wherein the dragging of the container modifies the size of the container such that the modified size is below a threshold, and including closing the container based of the modifying of the size.

14. The method of claim 1 wherein a separate content control is displayed, and including:
    receiving an indication that the user has dragged the separate content control; and
    modifying the displayed information based on the dragging.

15. The method of claim 14 including, before the receiving of the indication that the user has dragged the separate content control, receiving an indication that the separate content control is associated with the displayed information.

16. A non-transitory computer-readable medium containing instructions that when executed on a computer will perform the steps of claim 1.

17. A computer system for controlling display of information based on direct manipulation of the displayed information without use of separate manipulation controls, the information having multiple channels each representing an alternative stream of groups of information available for display, having a history including a series of previously displayed groups of information, and having multiple amplitudes at which the information can be displayed, comprising:
    a processor configured to:
    receive an indication of the information to be displayed;
    determine a current channel of the information, a current group of information from the stream associated with the current channel, and a current amplitude;
    display the current portion of the information at the current amplitude; and
    for each of a series of received indications that a user has dragged the displayed information,
        when the user has dragged the displayed information in a predefined direction associated with the channels, display a group of information from the stream associated with a new channel, the new channel selected based on the dragging;
        when the user has dragged the displayed information in a predefined manner associated with the amplitudes, display the current group of information at a new amplitude, the new amplitude selected based on the dragging; and when the user has dragged the displayed information in a predefined direction associated with the history, display a new group of information from the series of groups of information, the new group selected based on the dragging, so that the user can directly manipulate the display of information without the use of separate manipulation controls.

* * * * *